(12) United States Patent
Mentak et al.

(10) Patent No.: US 12,262,726 B2
(45) Date of Patent: Apr. 1, 2025

(54) PROTEIN-BASED THERAPEUTIC NUTRITIONAL PRODUCTS AND METHODS OF USING SAME

(71) Applicant: Advance International Inc., Livermore, CA (US)

(72) Inventors: Khalid Mentak, San Ramon, CA (US); Fred Jewett, Pleasanton, CA (US); Shahmard Maziar Ghorbani, Alamo, CA (US)

(73) Assignee: ADVANCE INTERNATIONAL INC., Livermore, CA (US)

( * ) Notice: Subject to any disclaimer, the term of this patent is extended or adjusted under 35 U.S.C. 154(b) by 554 days.

(21) Appl. No.: 17/155,664

(22) Filed: Jan. 22, 2021

(65) Prior Publication Data

US 2021/0386105 A1     Dec. 16, 2021

Related U.S. Application Data

(63) Continuation of application No. PCT/US2019/043120, filed on Jul. 23, 2019.

(60) Provisional application No. 62/702,091, filed on Jul. 23, 2018.

(51) Int. Cl.
| | | |
|---|---|---|
| *A23L 33/185* | (2016.01) | |
| *A23L 33/00* | (2016.01) | |
| *A23L 33/115* | (2016.01) | |
| *A23L 33/125* | (2016.01) | |
| *A23L 33/18* | (2016.01) | |

(52) U.S. Cl.
CPC ........... *A23L 33/185* (2016.08); *A23L 33/115* (2016.08); *A23L 33/125* (2016.08); *A23L 33/18* (2016.08); *A23L 33/40* (2016.08)

(58) Field of Classification Search
CPC ........ A23L 33/18; A23L 33/40; A23L 33/115; A23L 33/125; A23L 33/185
See application file for complete search history.

(56) References Cited

U.S. PATENT DOCUMENTS

| | | |
|---|---|---|
| 2006/0241016 A1 | 10/2006 | Haines |
| 2008/0009650 A1 | 1/2008 | Sluijmers et al. |
| 2008/0226810 A1 | 9/2008 | Passe et al. |
| 2010/0074986 A1* | 3/2010 | Bastiaans ............. A23D 7/0053 426/98 |
| 2011/0256299 A1* | 10/2011 | Helmke .................... A61P 3/02 426/601 |

(Continued)

FOREIGN PATENT DOCUMENTS

| | | |
|---|---|---|
| EP | 2319331 B1 | 8/2013 |
| WO | WO-2010030944 A3 | 10/2010 |

(Continued)

OTHER PUBLICATIONS

Laihao, Li et al. Studies on the Extraction of Fish Protein Concentrate (FPC) by Solvent Extraction FAO, Bangkok, Thailand (1998) pp. 114-118.

(Continued)

*Primary Examiner* — Anthony J Weier
(74) *Attorney, Agent, or Firm* — SNELL & WILMER L.L.P.

(57) ABSTRACT

Protein formulations with high protein content are included. Also included are methods of using the provided protein formulations.

20 Claims, 5 Drawing Sheets

(56) References Cited

U.S. PATENT DOCUMENTS

| | | | | |
|---|---|---|---|---|
| 2012/0058938 | A1* | 3/2012 | Hageman | A61P 1/16 514/12.3 |
| 2015/0064317 | A1* | 3/2015 | Sherwood | A23J 3/08 426/583 |
| 2016/0355546 | A1* | 12/2016 | Ghorbani | C11B 3/001 |
| 2017/0071239 | A1* | 3/2017 | Carpio | A23J 1/006 |
| 2017/0079935 | A1* | 3/2017 | Schiffrin | A61K 38/1709 |
| 2017/0164632 | A1* | 6/2017 | Pandya | A23C 15/12 |
| 2017/0208853 | A1* | 7/2017 | Gallardo | A23L 33/40 |
| 2018/0207205 | A1* | 7/2018 | Bruheim | A61K 35/612 |
| 2018/0289037 | A1 | 10/2018 | Schweizer et al. | |
| 2019/0216106 | A1* | 7/2019 | Geistlinger | A23C 9/15 |
| 2023/0219879 | A1* | 7/2023 | Petrie | A61K 31/20 514/549 |

FOREIGN PATENT DOCUMENTS

| | | |
|---|---|---|
| WO | WO-2011094549 A1 | 8/2011 |
| WO | WO-2011156380 A2 | 12/2011 |
| WO | WO-2020023557 A1 | 1/2020 |
| WO | WO-2021150794 A1 | 7/2021 |

OTHER PUBLICATIONS

PCT/US2019/043120 International Search Report and Written Opinion dated Oct. 1, 2019.

PCT/US2021/014472 International Search Report and Written Opinion dated May 12, 2021.

Green Facts, Scientific Facts on Boron. retrieved from Internet: http://web.archive.org/web/20060930055328/ http://www.greenfacts.org/en/boron/l-3/boron-3.htm#1 (2006).

Nabrzyski, M, and R Gajewska. Content of strontium, lithium and calcium in selected milk products and in some marine smoked fish. Die Nahrung vol. 46,3 (2002): 204-8.

U.S. Appl. No. 16/591,424 Final Office Action dated Feb. 3, 2023.

* cited by examiner

PROTEIN-BASED THERAPEUTIC NUTRITIONAL PRODUCTS AND METHODS OF USING SAME

CROSS-REFERENCE TO RELATED APPLICATIONS

This application is a continuation of International Application No. PCT/US2019/043120, filed Jul. 23, 2019, which claims the benefit of U.S. Provisional Application No. 62/702,091, filed Jul. 23, 2018, which are incorporated herein by reference in their entirety.

BACKGROUND OF THE INVENTION

Throughout the centuries, the development of human life has been based upon the nutrients and proteins that originate in the natural resources of Planet Earth, and which is obtained from the bio-diversity as it is adapted to climatological, continental and oceanic heterogeneity. The proteins generated by the food humans consume are dependent upon one of two points of origins, either animal or vegetable. This is combined with the physical and chemical characteristics of zones, all of which are not benign, as some zones are unstable and far removed from supply sources such as, but not limited to, the oceans or fertile lands, and vice-versa.

Humanity has developed primarily on portions of the continents and secondarily at the periphery of the oceans; hence the most widely exploited natural resources are those of the continents. This is the reason and cause of the imbalance between all living things and the food chain, and this imbalance is currently posing great problems and nutritional deficiencies among different populations. However, this also indicates that marine life is, and always has been an option to make up for the lack of nutrients. For this reason this resource is now being exploited considerably and in an unbalanced manner, and this has led to the protection of certain marine species from the danger of extinction. Even so, the oceans continue to offer an opportunity to obtain nutritional resources through the fishing industry. As has been established, the human body requires nutrients of high quality to survive, and scientific research shows that one can obtain protein nutrients from sea animals, principally from different species of fish. Thus, there exists a need in the food industry to obtain the highest quality protein possible from these sources and to formulate the protein in convenient easy to use form.

The development of the individual depends directly on nutrition during the gestational and postnatal periods, and a diet of poor or deficient quality during these critical stages of infant development can cause alterations not only in the nervous system, but also in the formation of a diverse number of internal organs, all of which can persist into adulthood. Thus, their also exists a need to control and or treat malnutrition in infants and children.

SUMMARY OF THE INVENTION

In one aspect, the disclosure provides a protein formulation, comprising greater than 20 wt % of a protein powder, wherein the protein powder comprises an animal or plant-based protein; and greater than 10 wt % of fat by weight. In some embodiments, the protein formulation comprises from about 14 wt % to about 18 wt % of the fat. In some embodiments, the protein formulation comprises about 16 wt % of the fat. In some embodiments, the protein formulation comprises from about 25 wt % to about 35 wt % of the fat. In some embodiments, the protein formulation comprises about 30 wt % of the fat. In some embodiments, the fat comprises omega-3 rich fish oil. In some embodiments, the protein formulations further comprise carbohydrates.

In another aspect, the disclosure provides protein formulations comprising greater than 20 wt % of a protein powder and from about 15 wt % to about 65 wt % of carbohydrates. In some embodiments, the protein formulations further comprise fat. In some embodiments, the protein formulations comprise from about 14 wt % to about 18 wt % of the fat. In some embodiments, the protein formulations comprise from about 16 wt % of the fat. In some embodiments, the protein formulations comprise from about 25 wt % to about 35 wt % of the fat. In some embodiments, the protein formulations comprise from about 30 wt % of the fat. In some embodiments, the fat comprises omega-3 rich fish oil.

In various embodiments, the protein formulations provided herein comprise from about 27 wt % to about 32 wt % of the carbohydrates. In some embodiments, the protein formulation comprises about 30 wt % of the carbohydrates. In some embodiments, the carbohydrates comprise fiber.

In another aspect, the disclosure provides a protein formulation, comprising: from about 35 wt % to about 55 wt % of a protein powder, from about 10 wt % to about 20 wt % of fat, and from about 25 wt % to about 35 wt % of carbohydrates.

In some embodiments, the protein formulations provided herein comprise from about 40 wt % to about 50 wt % of the protein powder. In some embodiments the protein formulation comprises from about 40 wt % to about 45 wt % of the protein powder. In some embodiments the protein formulation comprises about 42 wt % of the protein powder.

In some embodiments, the protein formulations comprise from about 14 wt % to about 18 wt % of the fat. In some embodiments, the protein formulation comprises about 16 wt % of the fat. In some embodiments, the fat comprises omega-3 rich fish oil.

In some embodiments, the protein formulation comprises from about 27 wt % to about 32 wt % of the carbohydrates. In some embodiments, the protein formulation comprises about 30 wt % of the carbohydrates. In some embodiments, the carbohydrates comprise fiber.

In various embodiments, the protein formulations provided herein have a slow digestive release.

In another aspect the disclosure provides a protein formulation, comprising: from about 20 wt % to about 40 wt % of a protein powder, from about 20 wt % to about 40 wt % of fat, from about 25 wt % to about 35 wt % of carbohydrates. In some embodiments, the protein formulation comprises from about 25 wt % to about 35 wt % of the protein powder. In some embodiments, the protein formulation comprises about 30 wt % of the protein powder. In some embodiments, the protein formulation comprises from about 25 wt % to about 35 wt % of the fat. In some embodiments, the protein formulation comprises about 30 wt % of the fat. In some embodiments, the fat comprises omega-3 rich fish oil. In some embodiments, the protein formulation comprises from about 27 wt % to about 32 wt % of the carbohydrates. In some embodiments, the protein formulation comprises about 30 wt % of the carbohydrates. In some embodiments, the carbohydrates comprise fiber.

In various embodiments, the protein powder in the protein formulations of the disclosure comprises an animal protein. In some embodiments, the animal protein is a protein from a marine animal. In some embodiments, the animal protein is a protein from a fish.

In various embodiments, the protein formulations provided herein comprise a sweetener. In various embodiments, the sweetener is a plant-based sweetener. In various embodiments, the sweetener is a non-nutritive sweetener.

In various embodiments, the protein formulations provided herein comprise one or more vitamins. In some embodiments, the one or more vitamins are selected from the group comprising retinoids, carotenes, thiamin, riboflavin, niacin, pantothenic acid, pyridoxine, cobalamin, biotin, ascorbic acid, choline calciferol, cholecalciferol, ergocalciferol, alpha-tocopherol, folic acid, phylloquinone, and menadione.

In various embodiments, the protein formulations provided herein comprise an emulsifier. In some embodiments, the emulsifier is a lipophilic emulsifier.

In various embodiments, the protein formulations provided herein comprise an electrolyte. In some embodiments, the electrolyte is selected from the group comprising calcium, chloride, fluoride, iodine, magnesium, potassium, sodium, sulfate, hydrosulfate, carbonate, and hydrocarbonate.

In various embodiments, the protein formulations provided herein comprise one or more minerals. In some embodiments, the one or more minerals are selected from the group comprising calcium, chloride, chromium, copper, fluoride, iodine, iron, magnesium, manganese, molybdenum, phosphorus, potassium, selenium, sodium, sulfur, and zinc.

In various embodiments, the protein formulations provided herein comprise one or more flavoring agents.

In various embodiments, the protein formulations provided herein comprise one or more stabilizing agents. In some embodiments, the one or more stabilizing agents are selected from the group consisting of sterins, tocopherols, and ascorbyl palmitate.

In various embodiments, the protein formulations provided herein comprise one a therapeutic agent. In some embodiments, the therapeutic agent comprises a *Cannabis* extract.

In various embodiments, the protein formulations provided herein have a glycemic index of no more than 55.

In various embodiments, the protein powder in the protein formulations provided herein is water insoluble.

In various embodiments, the protein powder in the protein formulation provided herein protein powder is non-hygroscopic. In some embodiments, the protein powder comprises non-hydrolyzed protein.

In various embodiments, the protein formulations provided herein have an osmolality between about 100 mOsm/kg and about 1000 mOsm/kg.

In various embodiments, the protein formulations provided herein a slow digestive release.

In various embodiments, the protein formulations provided herein are ready for consumption by a human.

In various embodiments, the protein formulations provided herein are a solid, a liquid, or a paste. In some embodiments, the protein formulations are a liquid or a paste comprised in a squeezable pouch.

In various embodiments, about 50 g of the protein formulation comprises about 200-350 calories. In some embodiments, about 50 g of the protein formulation comprises about 50% of daily required vitamins and minerals.

In various embodiments, the protein formulation has low water activity.

In another aspect, the disclosure provides a ready to use therapeutic food, wherein said ready to use therapeutic food comprises an animal protein and has a nutritional profile similar to a traditional F-75 or F-100 milk-based diet. In some embodiments, the ready to use therapeutic food is lactose free. In some embodiments, the ready to use therapeutic food does not comprise milk protein. In some embodiments, the ready to use therapeutic food does not comprise whey protein. In some embodiments, the ready to use therapeutic food has a protein digestibility corrected amino acid score of at least 70%.

In another aspect, the disclosure provides a method of treating an individual, the method comprising administering to the patient the protein formulations provided herein. In some embodiments, the patient has a chronic condition. In some embodiments, the patient suffers from dehydration, nausea, vomiting, or pain. In some embodiments, the patient is recovering from a surgery or from a therapy. In some embodiments, the therapy is chemotherapy.

In another aspect, the disclosure provides a method of feeding an individual on a diet, the method comprising administering to the individual the protein formulations provided herein. In some embodiments, the diet is a ketogenic diet or a fast mimicking diet.

In another aspect, the disclosure provides a method of treating malnutrition in an individual suffering thereof, the method comprising administering to the individual the ready to use therapeutic food of the disclosure. In some embodiments, the malnutrition is severe acute malnutrition or moderate acute malnutrition. In some embodiments, the individual is a child.

In another aspect of the present invention, an improved system and method for recovering products from animal tissue is described. Specifically, the technique involves combining animal tissue and organic solvent in sufficient proportions to produce a mixture thereof. The mixture is agitated, heated and filtered in a tank to produce protein powder meal. Preferably, the tank is a single unitary structure. Also recovered is animal oil and water derived from the animal. In a preferred embodiment, the animal tissue is fish, and the recovered products include fish protein, fish oils and water derived from the fish. In an exemplary embodiment, the solid protein (also referred as "protein powder meal," used interchangeable herein) is transferred to a mill for further processing into a powder. In a yet another exemplary embodiment, a filtered, liquid portion of the mixture is filtered to separate fish oil from water. In a further embodiment, the portion of the mixture retained in the single unitary structure after filtration is combined with recycled organic solvent. The recycled organic solvent is recovered from the liquid portion of the mixture. In some embodiments, the solid product comprises the protein in the protein formulation described herein. In some embodiments, the solid product further comprises the fat described herein. In some embodiments, the fat described herein comprises omega-3. In some embodiments, the solid product comprises the protein described herein. In some embodiments, the solid product further comprises the fat described herein. In some embodiments, the fat described herein comprises omega-3. In some embodiments, the protein in the protein formulation described in this aspect has low osmolality. In some embodiments, the protein in the protein formulation described herein has an osmolality between about 100 mOsm/kg and 1000 mOsm/kg, for example between 200 mOsm/kg and 1000 mOsm/kg, between 300 mOsm/kg and 1000 mOsm/kg, between 400 mOsm/kg and 1000 mOsm/kg, between 500 mOsm/kg and 1000 mOsm/kg, between 600 mOsm/kg and 1000 mOsm/kg, between 700 mOsm/kg and 1000 mOsm/kg, between 800 mOsm/kg and 1000 mOsm/kg, or between 900 mOsm/kg and 1000 mOsm/kg. In some embodiments, the osmolality of the protein formulations described herein is less than about 300 mOsm/kg, less than about 275 mOsm/kg, less than about 250 mOsm/kg, less than about 240 mOsm/kg, less than about 230 mOsm/kg, less than about 220 mOsm/kg, less than about 210 mOsm/kg, or less than about 200 mOsm/kg. In some embodiments, the protein in the protein formulations described herein have a GI of at least about 0. In some embodiments, the protein in the protein formulations described herein have a GI of at most about 70. In some embodiments, the protein in the protein formulations described herein have a GI of about 0 to about 10, about 0 to about 20, about 0 to about 30, about 0 to about 40, about 0 to about 50, about 0 to about 60, about 0 to about 70, about 10 to about 20, about 10 to about 30, about 10 to about 40, about 10 to about 50, about 10 to about 60, about 10 to about 70, about 20 to about 30, about 20 to about 40, about 20 to about 50, about 20 to about 60, about 20 to about 70, about 30 to about 40, about 30 to about 50, about 30 to about 60, about 30 to about 70, about 40 to about 50, about 40 to about 60, about 40 to about 70, about 50 to about 60, about 50 to about 70, or about 60 to about 70. In some embodiments, the protein in the protein formulations described herein have a GI of about 0, about 10, about 20, about 30, about 40, about 50, about 60, or about 70. In some embodiments, the protein in the protein formulation described herein have a GI of at least about 0. In some embodiments, the protein in the protein formulations described herein have a GI of at most about 70. In some embodiments, the protein in the protein formulations described herein have a GI of about 0 to about 10, about 0 to about 20, about 0 to about 30, about 0 to about 40, about 0 to about 50, about 0 to about 60, about 0 to about 70, about 10 to about 20, about 10 to about 30, about 10 to about 40, about 10 to about 50, about 10 to about 60, about 10 to about 70, about 20 to about 30, about 20 to about 40, about 20 to about 50, about 20 to about 60, about 20 to about 70, about 30 to about 40, about 30 to about 50, about 30 to about 60, about 30 to about 70, about 40 to about 50, about 40 to about 60, about 40 to about 70, about 50 to about 60, about 50 to about 70, or about 60 to about 70. In some embodiments, the protein in the protein formulations described herein have a GI of about 0, about 10, about 20, about 30, about 40, about 50, about 60, or about 70. In certain embodiments, the protein in the protein formulation described herein PDCAAS score greater than 0, for example greater than 0.5, greater than 0.6, greater than 0.7, greater than 0.8, greater than 0.9, greater than 0.97, or greater than 0.99. In other embodiments of the disclosure, the protein in the protein formulations have a PDCAAS score in the range of from about 0.6 to about 1.0. In other embodiments, PDCAAS score is in the range of 0.75 to 1.0. In some embodiments, the PDCAAS score is in the range of from 0.85 to 1.0. In some embodiments, the PDCAAS score is 1 (or greater than one, which is considered as 1). In some embodiments, the drying process described herein removes the moisture content of the protein in the protein formulation. The low-to-zero moisture content of the protein in the protein formulation enables the protein formulation to have a long shelf life because microorganisms are not able to live without moisture. In some embodiments, protein formulations disclosed herein has a shelf life of at least about 0.5 years to about 15 years. In some examples, protein formulations disclosed herein have a shelf life of at least about 0.5 years. In some examples, protein formulations disclosed herein have a shelf life of at most about 15 years. In some examples, protein formulations disclosed herein have a shelf life of at least about 0.5 years to about 1 year, about 0.5 years to about 1.5 years, about 0.5 years to about 2 years, about 0.5 years to about 2.5 years, about 0.5 years to about 3 years, about 0.5 years to about 2.5 years, about 0.5 years to about 4 years, about 0.5 years to about 4.5 years, about 0.5 years to about 5 years, about 0.5 years to about 10 years, about 0.5 years to about 15 years, about 1 year to about 1.5 years, about 1 year to about 2 years, about 1 year to about 2.5 years, about 1 year to about 3 years, about 1 year to about 2.5 years, about 1 year to about 4 years, about 1 year to about 4.5 years, about 1 year to about 5 years, about 1 year to about 10 years, about 1 year to about 15 years, about 1.5 years to about 2 years, about 1.5 years to about 2.5 years, about 1.5 years to about 3 years, about 1.5 years to about 2.5 years, about 1.5 years to about 4 years, about 1.5 years to about 4.5 years, about 1.5 years to about 5 years, about 1.5 years to about 10 years, about 1.5 years to about 15 years, about 2 years to about 2.5 years, about 2 years to about 3 years, about 2 years to about 2.5 years, about 2 years to about 4 years, about 2 years to about 4.5 years, about 2 years to about 5 years, about 2 years to about 10 years, about 2 years to about 15 years, about 2.5 years to about 3 years, about 2.5 years to about 2.5 years, about 2.5 years to about 4 years, about 2.5 years to about 4.5 years, about 2.5 years to about 5 years, about 2.5 years to about 10 years, about 2.5 years to about 15 years, about 3 years to about 2.5 years, about 3 years to about 4 years, about 3 years to about 4.5 years, about 3 years to about 5 years, about 3 years to about 10 years, about 3 years to about 15 years, about 2.5 years to about 4 years, about 2.5 years to about 4.5 years, about 2.5 years to about 5 years, about 2.5 years to about 10 years, about 2.5 years to about 15 years, about 4 years to about 4.5 years, about 4 years to about 5 years, about 4 years to about 10 years, about 4 years to about 15 years, about 4.5 years to about 5 years, about 4.5 years to about 10 years, about 4.5 years to about 15 years, about 5 years to about 10 years, about 5 years to about 15 years, or about 10 years to about 15 years. In some examples, protein formulations disclosed herein have a shelf life of at least about 0.5 years, about 1 year, about 1.5 years, about 2 years, about 2.5 years, about 3 years, about 2.5 years, about 4 years, about 4.5 years, about 5 years, about 10 years, or about 15 years. In some embodiments, protein formulations disclosed herein have a shelf life of at least about 15 years. In some embodiments, the protein in the protein formulation in the protein has a solubility of less than 50%, less than 40%, less than 30%, less than 20%, less than 15%, less than 10%, less than 7%, less than 5%, less than 3%, less than 2%, less than 1%, or less than 0.5% at a pH range of about 1-8, for example at a pH of 7. In some embodiments, the protein in the protein formulations disclosed herein are non-hygroscopic i.e. they do not adsorb moisture from the surrounding atmosphere. In some embodiments, the protein in the protein formulation has a digestibility coefficient of at least about 70%. In some embodiments, the protein in the protein formulation has a digestibility coefficient of at least about 80%. In some embodiments, the protein in the protein formulation has a digestibility coefficient of at least about 90%. In some embodiments, the protein in the protein formulation has a digestibility coefficient of at least about 95%. In some embodiments, the protein in the protein formulation has a digestibility coefficient of at least about 97%. In some embodiments, the protein in the protein formulation has a digestibility coefficient of at least about 98%. In some embodiments, the protein in the protein formulation has a digestibility coefficient of at least about 99%.

In another aspect of the present invention, there is described a system for recovering products from animal tissue. Preferably, the animal tissue is fish. The system includes a filter-dryer reaction tank including one or more inputs and outputs. Animal tissue feedstock and organic solvent are independently, or collectively, fed into the filter-dryer reaction tank. The filter-dryer-reaction tank mixes, heats and filters a mixture containing animal tissue and organic solvent. The filter-dryer reaction tank includes an output for removing filtrate, as well as an output for removing solid product. In some embodiments, the solid product comprises the protein described herein. In some embodiments, the solid product further comprises the fat described herein. In some embodiments, the fat described herein comprises omega-3. In some embodiments, the protein in the protein formulation described in this aspect has low osmolality. In some embodiments, the protein in the protein formulation described herein has an osmolality between about 100 mOsm/kg and 1000 mOsm/kg, for example between 200 mOsm/kg and 1000 mOsm/kg, between 300 mOsm/kg and 1000 mOsm/kg, between 400 mOsm/kg and 1000 mOsm/kg, between 500 mOsm/kg and 1000 mOsm/kg, between 600 mOsm/kg and 1000 mOsm/kg, between 700 mOsm/kg and 1000 mOsm/kg, between 800 mOsm/kg and 1000 mOsm/kg, or between 900 mOsm/kg and 1000 mOsm/kg. In some embodiments, the osmolality of the protein formulations described herein is less than about 300 mOsm/kg, less than about 275 mOsm/kg, less than about 250 mOsm/kg, less than about 240 mOsm/kg, less than about 230 mOsm/kg, less than about 220 mOsm/kg, less than about 210 mOsm/kg, or less than about 200 mOsm/kg. In some embodiments, the protein in the protein formulations described herein have a GI of at least about 0. In some embodiments, the protein in the protein formulations described herein have a GI of at most about 70. In some embodiments, the protein in the protein formulations described herein have a GI of about 0 to about 10, about 0 to about 20, about 0 to about 30, about 0 to about 40, about 0 to about 50, about 0 to about 60, about 0 to about 70, about 10 to about 20, about 10 to about 30, about 10 to about 40, about 10 to about 50, about 10 to about 60, about 10 to about 70, about 20 to about 30, about 20 to about 40, about 20 to about 50, about 20 to about 60, about 20 to about 70, about 30 to about 40, about 30 to about 50, about 30 to about 60, about 30 to about 70, about 40 to about 50, about 40 to about 60, about 40 to about 70, about 50 to about 60, about 50 to about 70, or about 60 to about 70. In some embodiments, the protein in the protein formulations described herein have a GI of about 0, about 10, about 20, about 30, about 40, about 50, about 60, or about 70. In some embodiments, the protein in the protein formulations described herein have a GI of at least about 0. In some embodiments, the protein in the protein formulations described herein have a GI of at most about 70. In some embodiments, the protein in the protein formulations described herein have a GI of about 0 to about 10, about 0 to about 20, about 0 to about 30, about 0 to about 40, about 0 to about 50, about 0 to about 60, about 0 to about 70, about 10 to about 20, about 10 to about 30, about 10 to about 40, about 10 to about 50, about 10 to about 60, about 10 to about 70, about 20 to about 30, about 20 to about 40, about 20 to about 50, about 20 to about 60, about 20 to about 70, about 30 to about 40, about 30 to about 50, about 30 to about 60, about 30 to about 70, about 40 to about 50, about 40 to about 60, about 40 to about 70, about 50 to about 60, about 50 to about 70, or about 60 to about 70. In some embodiments, the protein in the protein formulations described herein have a GI of about 0, about 10, about 20, about 30, about 40, about 50, about 60, or about 70. In certain embodiments, the protein in the protein formulation described herein PDCAAS score greater than 0, for example greater than 0.5, greater than 0.6, greater than 0.7, greater than 0.8, greater than 0.9, greater than 0.97, or greater than 0.99. In other embodiments of the disclosure, the protein in the protein formulations have a PDCAAS score in the range of from about 0.6 to about 1.0. In other embodiments, PDCAAS score is in the range of 0.75 to 1.0. In some embodiments, the PDCAAS score is in the range of from 0.85 to 1.0. In some embodiments, the PDCAAS score is 1 (or greater than one, which is considered as 1). In some embodiments, the drying process described herein removes the moisture content of the protein in the protein formulation. The low-to-zero moisture content of the protein in the protein formulation enables the protein formulation to have a long shelf life because microorganisms are not able to live without moisture. In some embodiments, protein formulations disclosed herein has a shelf life of at least about 0.5 years to about 15 years. In some examples, protein formulations disclosed herein have a shelf life of at least about 0.5 years. In some examples, protein formulations disclosed herein have a shelf life of at most about 15 years. In some examples, protein formulations disclosed herein have a shelf life of at least about 0.5 years to about 1 year, about 0.5 years to about 1.5 years, about 0.5 years to about 2 years, about 0.5 years to about 2.5 years, about 0.5 years to about 3 years, about 0.5 years to about 2.5 years, about 0.5 years to about 4 years, about 0.5 years to about 4.5 years, about 0.5 years to about 5 years, about 0.5 years to about 10 years, about 0.5 years to about 15 years, about 1 year to about 1.5 years, about 1 year to about 2 years, about 1 year to about 2.5 years, about 1 year to about 3 years, about 1 year to about 2.5 years, about 1 year to about 4 years, about 1 year to about 4.5 years, about 1 year to about 5 years, about 1 year to about 10 years, about 1 year to about 15 years, about 1.5 years to about 2 years, about 1.5 years to about 2.5 years, about 1.5 years to about 3 years, about 1.5 years to about 2.5 years, about 1.5 years to about 4 years, about 1.5 years to about 4.5 years, about 1.5 years to about 5 years, about 1.5 years to about 10 years, about 1.5 years to about 15 years, about 2 years to about 2.5 years, about 2 years to about 3 years, about 2 years to about 2.5 years, about 2 years to about 4 years, about 2 years to about 4.5 years, about 2 years to about 5 years, about 2 years to about 10 years, about 2 years to about 15 years, about 2.5 years to about 3 years, about 2.5 years to about 4 years, about 2.5 years to about 4.5 years, about 2.5 years to about 5 years, about 2.5 years to about 10 years, about 2.5 years to about 15 years, about 3 years to about 2.5 years, about 3 years to about 4 years, about 3 years to about 4.5 years, about 3 years to about 5 years, about 3 years to about 10 years, about 3 years to about 15 years, about 2.5 years to about 4 years, about 2.5 years to about 4.5 years, about 2.5 years to about 5 years, about 2.5 years to about 10 years, about 2.5 years to about 15 years, about 4 years to about 4.5 years, about 4 years to about 5 years, about 4 years to about 10 years, about 4 years to about 15 years, about 4.5 years to about 5 years, about 4.5 years to about 10 years, about 4.5 years to about 15 years, about 5 years to about 10 years, about 5 years to about 15 years, or about 10 years to about 15 years. In some examples, protein formulations disclosed herein have a shelf life of at least about 0.5 years, about 1 year, about 1.5 years, about 2 years, about 2.5 years, about 3 years, about 2.5 years, about 4 years, about 4.5 years, about 5 years, about 10 years, or about 15 years. In some embodiments, protein formulations disclosed herein have a shelf life of at least about 15 years. In some embodiments, the protein in the protein formulation in the protein has a solubility of less than 50%, less than 40%, less than 30%, less than 20%, less than 15%, less than 10%, less than 7%, less than 5%, less than 3%, less than 2%, less than 1%, or less than 0.5% at a pH range of about 1-8, for example at a pH of 7. In some embodiments, the protein in the protein formulations disclosed herein are non-hygroscopic i.e. they do not adsorb moisture from the surrounding atmosphere. In some embodiments, the protein in the protein formulation has a digestibility coefficient of at least about 70%. In some embodiments, the protein in the protein formulation has a digestibility coefficient of at least about 80%. In some embodiments, the protein in the protein formulation has a digestibility coefficient of at least about 90%. In some embodiments, the protein in the protein formulation has a digestibility coefficient of at least about 95%. In some embodiments, the protein in the protein formulation has a digestibility coefficient of at least about 97%. In some embodiments, the protein in the protein formulation has a digestibility coefficient of at least about 98%. In some embodiments, the protein in the protein formulation has a digestibility coefficient of at least about 99%.

INCORPORATION BY REFERENCE

All publications, patents, and patent applications, and NCBI accession numbers mentioned in this specification are herein incorporated by reference to the same extent as if each individual publication, patent, patent application, or NCBI accession number was specifically and individually indicated to be incorporated by reference. To the extent publications and patents, patent applications, or NCBI accession numbers incorporated by reference contradict the disclosure contained in the specification, the specification is intended to supersede and/or take precedence over any such contradictory material.

BRIEF DESCRIPTION OF THE DRAWINGS

The accompanying drawings, which are incorporated herein and constitute a part of this specification, illustrate embodiments of the invention and together with the description serve to explain the principles of the invention.

Figure 1:
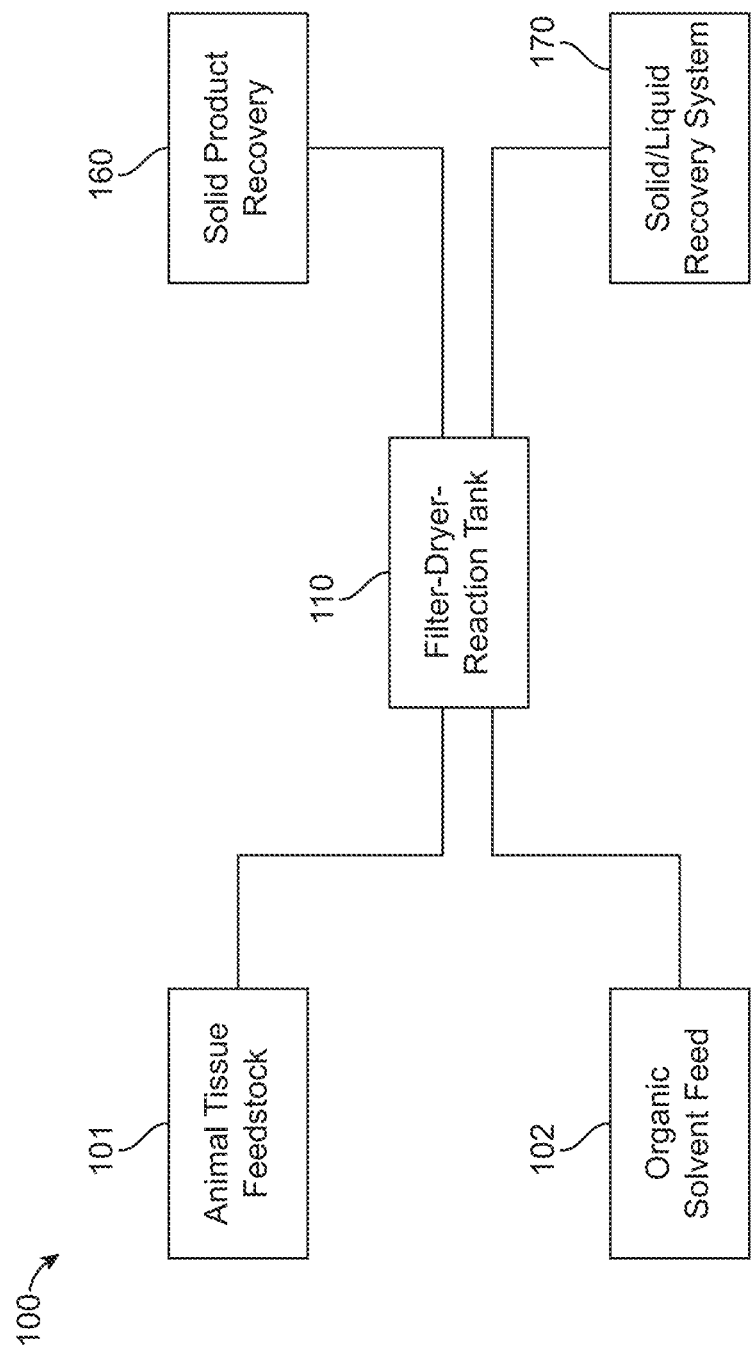
FIG. 1 is an illustration of an apparatus for preparing the present invention in accordance with exemplary embodiments of the present invention.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

DETAILED DESCRIPTION OF THE INVENTION

While various embodiments of the disclosure have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments of the disclosure described herein may be employed.

Unless defined otherwise, all technical and scientific terms used herein have the same meaning as commonly understood by one of ordinary skill in the art to which the present disclosure belongs. In case of conflict, the present application including the definitions will control. Also, unless otherwise required by context, singular terms shall include pluralities and plural terms shall include the singular.

Overview

Provided herein are novel highly nutritional protein formulations. In various embodiments, the protein formulations described herein comprise nutrients, minerals and/or vitamins necessary to sustain life. Additionally, the protein formulations of the disclosure may be highly concentrated, providing complete nutrition in a reduced volume. Additionally, in various examples, the protein formulations of the disclosure are prepared without the addition of water. As such, the protein formulations of the invention do not suffer from bacterial growth and spoilage even at warm temperatures and/or humid conditions. This results in unique and novel food preparations with a long shelf life. In some examples, the protein formulations described herein have long shelf life without the need for preservatives.

In some embodiments, the protein formulations described herein comprise greater than 20 wt % of a protein powder, for example greater than 30%, greater than 40%, greater than 50%, or greater than 60% protein powder. The protein powder used in the protein formulations of the disclosure may comprise a plant protein, an animal protein, or a mixture thereof. In some examples, the protein powder used in the protein formulations disclosed herein comprises fish protein. In various embodiments the protein powder used in the protein formulations of the disclosure is water insoluble. In some embodiments, the protein powder used in formulations of the disclosure is non-hygroscopic. In some embodiments, the protein powder used in the protein formulations of the disclosure is water insoluble and non-hygroscopic. Additionally, in some examples, the protein powder used in the protein formulations disclosed herein has a complete amino acid profile, comprising all essential amino acids. Furthermore, the protein powder used in the protein formulation of the disclosure has a high digestibility.

The protein powder of the disclosure also comprises fat. In some examples, the fat in the protein formulations disclosed herein comprises omega-3 rich fat, for example omega-3 rich fish oil.

The protein formulations described herein also comprise carbohydrates. In some cases, said carbohydrates are complex carbohydrates. In some examples, the complex carbohydrates additionally comprise fiber.

In some embodiments, about 50 g of the protein formulation disclosed herein comprises about 200 to 350 calories, for example about 250 to 350 calories or about 300 to 350 calories per serving.

In various embodiments, the protein formulations of the disclosure have low osmolality. In some embodiments, the protein formulations described herein have an osmolality between about 100 mOsm/kg and 1000 mOsm/kg, for example between 200 mOsm/kg and 1000 mOsm/kg, between 300 mOsm/kg and 1000 mOsm/kg, between 400 mOsm/kg and 1000 mOsm/kg, between 500 mOsm/kg and 1000 mOsm/kg, between 600 mOsm/kg and 1000 mOsm/kg, between 700 mOsm/kg and 1000 mOsm/kg, between 800 mOsm/kg and 1000 mOsm/kg, or between 900 mOsm/kg and 1000 mOsm/kg. In some embodiments, the osmolality of the protein formulations described herein is less than about 300 mOsm/kg, less than about 275 mOsm/kg, less than about 250 mOsm/kg, less than about 240 mOsm/kg, less than about 230 mOsm/kg, less than about 220 mOsm/kg, less than about 210 mOsm/kg, or less than about 200 mOsm/kg.

In various embodiments, the protein formulations described herein have a low glycemic index. The glycemic index (GI) is a ranking of food on a scale from 0 to 100 according to the extent to which they raise blood sugar levels after eating. Glucose for example has a GI of 100, sucrose has a GI of 65+ and isomaltulose has a GI of 32. Foods with a high GI (>50) are those which are rapidly digested and absorbed and result in marked fluctuations in blood sugar levels. Low-GI foods (<40), by virtue of their slow digestion and absorption, produce gradual rises in blood sugar and insulin levels, and have proven beneficial for health. Low GI diets have shown to improve both glucose and lipid levels in humans with diabetes (type 1 and type 2). They also have benefits in weight control because they help to control appetite and delay hunger. Low GI diets also reduce insulin levels and insulin resistance. In some embodiments, the protein formulations described herein have a GI of about 0 to about 70. In some embodiments, the protein formulations described herein have a GI of at least about 0. In some embodiments, the protein formulations described herein have a GI of at most about 70. In some embodiments, the protein formulations described herein have a GI of about 0 to about 10, about 0 to about 20, about 0 to about 30, about 0 to about 40, about 0 to about 50, about 0 to about 60, about 0 to about 70, about 10 to about 20, about 10 to about 30, about 10 to about 40, about 10 to about 50, about 10 to about 60, about 10 to about 70, about 20 to about 30, about 20 to about 40, about 20 to about 50, about 20 to about 60, about 20 to about 70, about 30 to about 40, about 30 to about 50, about 30 to about 60, about 30 to about 70, about 40 to about 50, about 40 to about 60, about 40 to about 70, about 50 to about 60, about 50 to about 70, or about 60 to about 70. In some embodiments, the protein formulations described herein have a GI of about 0, about 10, about 20, about 30, about 40, about 50, about 60, or about 70.

As used herein, the term "glycemic load" refers to the impact of a food on blood glucose. Glycemic load refers to the glycemic index of a food relative to its carbohydrate load. Thus, glycemic load is calculated as follows: (Glycemic Index/Available Carbohydrates)×100. In certain embodiments, the protein formulations disclosed herein will have a glycemic load of not more than about 12 on a 50 g basis. In certain embodiments, the protein formulations disclosed herein will have a glycemic load of not more than about 10 on a 50 g reference basis. In certain embodiments, the protein formulations disclosed herein will have a glycemic load of not more than about 8 on a 50 g reference basis. In certain embodiments, the protein formulations disclosed herein will have a glycemic load of not more than about 6 on a 50 g reference basis. In certain embodiments, the protein formulations disclosed herein will have a glycemic load of not more than about 4 on a 50 g reference basis. In certain embodiments, the protein formulations disclosed herein will have a glycemic load of not more than about 2 on a 50 g reference basis.

The protein formulations of the invention will have water activities that are sufficiently low to prevent the growth of most pathogenic and spoilage bacteria. The protein formulations of the disclosure have water activities that are less than or equal to about 0.90. In some embodiments, the protein formulations of the disclosure will a water activity less than about 0.85. In some embodiments the protein formulations will have a water activity not more than about 0.80, not more than about 0.75, or not more than about 0.70.

The Protein Digestibility-Corrected Amino Acid Score (PDCAAS) is a method for evaluation of protein quality that is described in Protein Quality Evaluation, Food and Nutrition Paper 51, Rome, Italy: FAO/WHO, 1991, p 35. To calculate a PDCAAS value, a food is analyzed for proximate and amino acid composition. A protein digestibility value is obtained from a data base or determined by the rat balance method. An amino acid score is determined as follows: Amino Acid Score=MCI of essential amino acid in 1.0 q test protein mg of essential amino acid in 1.0 g reference pattern The PDCAAS is then calculated by multiplying the lowest amino acid score×true protein digestibility: PDCAAS=Lowest Amino Acid Score×True Digestibility Scores above 1.00 are considered as 1.00.

In certain embodiments, the protein formulations of the disclosure have PDCAAS score greater than 0, for example greater than 0.5, greater than 0.6, greater than 0.7, greater than 0.8, greater than 0.9, greater than 0.97, or greater than 0.99. In other embodiments of the disclosure, the protein formulations have a PDCAAS score in the range of from about 0.6 to about 1.0. In other embodiments, PDCAAS score is in the range of 0.75 to 1.0. In some embodiments, the PDCAAS score is in the range of from about 0.85 to 1.0. In some embodiments, the PDCAAS score is 1 (or greater than one, which is considered as 1).

As previously indicated, in various embodiments, the protein formulations disclosed herein are prepared without addition of water. As such the protein formulations disclosed herein comprise essentially no water. As such, the protein formulations of the disclosure have a long shelf-life. The term shelf-life as used herein means a period of time for which the protein formulation can be stored for, at ambient temperature, while maintaining substantially the same physical and chemical properties, e.g. taste, smell, color, and the like. In some examples, protein formulations disclosed herein have a shelf life of at least about 0.5 years to about 15 years. In some examples, protein formulations disclosed herein have a shelf life of at least about 0.5 years. In some examples, protein formulations disclosed herein have a shelf life of at most about 15 years. In some examples, protein formulations disclosed herein have a shelf life of at least about 0.5 years to about 1 year, about 0.5 years to about 1.5 years, about 0.5 years to about 2 years, about 0.5 years to about 2.5 years, about 0.5 years to about 3 years, about 0.5 years to about 2.5 years, about 0.5 years to about 4 years, about 0.5 years to about 4.5 years, about 0.5 years to about 5 years, about 0.5 years to about 10 years, about 0.5 years to about 15 years, about 1 year to about 1.5 years, about 1 year to about 2 years, about 1 year to about 2.5 years, about 1 year to about 3 years, about 1 year to about 2.5 years, about 1 year to about 4 years, about 1 year to about 4.5 years, about 1 year to about 5 years, about 1 year to about 10 years, about 1 year to about 15 years, about 1.5 years to about 2 years, about 1.5 years to about 2.5 years, about 1.5 years to about 3 years, about 1.5 years to about 2.5 years, about 1.5 years to about 4 years, about 1.5 years to about 4.5 years, about 1.5 years to about 5 years, about 1.5 years to about 10 years, about 1.5 years to about 15 years, about 2 years to about 2.5 years, about 2 years to about 3 years, about 2 years to about 2.5 years, about 2 years to about 4 years, about 2 years to about 4.5 years, about 2 years to about 5 years, about 2 years to about 10 years, about 2 years to about 15 years, about 2.5 years to about 3 years, about 2.5 years to about 2.5 years, about 2.5 years to about 4 years, about 2.5 years to about 4.5 years, about 2.5 years to about 5 years, about 2.5 years to about 10 years, about 2.5 years to about 15 years, about 3 years to about 2.5 years, about 3 years to about 4 years, about 3 years to about 4.5 years, about 3 years to about 5 years, about 3 years to about 10 years, about 3 years to about 15 years, about 2.5 years to about 4 years, about 2.5 years to about 4.5 years, about 2.5 years to about 5 years, about 2.5 years to about 10 years, about 2.5 years to about 15 years, about 4 years to about 4.5 years, about 4 years to about 5 years, about 4 years to about 10 years, about 4 years to about 15 years, about 4.5 years to about 5 years, about 4.5 years to about 10 years, about 4.5 years to about 15 years, about 5 years to about 10 years, about 5 years to about 15 years, or about 10 years to about 15 years. In some examples, protein formulations disclosed herein have a shelf life of at least about 0.5 years, about 1 year, about 1.5 years, about 2 years, about 2.5 years, about 3 years, about 2.5 years, about 4 years, about 4.5 years, about 5 years, about 10 years, or about 15 years. In some examples, protein formulations disclosed herein have a shelf life of at least about 15 years.

In some embodiments, by virtue of their extended shelf-life of the protein formulations of the present disclosure do not require refrigeration or freezing. The protein formulations are thus suitable for shipping and distribution. The protein formulations can be thus also be purchased in larger, more convenient and/or cost-effective quantities, as the quality of the protein formulations will be maintained for long periods of time.

Protein

The protein formulations described herein comprise a protein. The amount of protein in the protein formulations will depend on the targeted application of the protein formulation. In some embodiments, the protein formulations described have a high protein content. In some examples, the protein compositions described herein comprise from about 10 wt % to about 95 wt % of protein. In some examples, the protein compositions described herein comprise from about 15 wt % to about 90 wt % of protein. In some examples, the protein formulations described herein comprise from about 20 wt % to about 80 wt % of protein. In some examples, the amount of protein in the protein formulations described herein is from about 20 wt % to about 75 wt %. In some examples, the amount of protein in the protein formulations described herein is at least about 20 wt %. In some examples, the amount of protein in the protein compositions described herein is from about 20 wt % to about 25 wt %, about 20 wt % to about 30 wt %, about 20 wt % to about 35 wt %, about 20 wt % to about 40 wt %, about 20 wt % to about 45 wt %, about 20 wt % to about 50 wt %, about 20 wt % to about 55 wt %, about 20 wt % to about 60 wt %, about 20 wt % to about 65 wt %, about 20 wt % to about 70 wt %, about 20 wt % to about 75 wt %, about 20 wt % to about 80 wt %, about 20 wt % to about 85 wt %, about 20 wt % to about 90 wt %, about 20 wt % to about 95 wt %, about 25 wt % to about 30 wt %, about 25 wt % to about 35 wt %, about 25 wt % to about 40 wt %, about 25 wt % to about 45 wt %, about 25 wt % to about 50 wt %, about 25 wt % to about 55 wt %, about 25 wt % to about 60 wt %, about 25 wt % to about 65 wt %, about 25 wt % to about 70 wt %, about 25 wt % to about 75 wt %, about 25 wt % to about 80 wt %, about 25 wt % to about 85 wt %, about 25 wt % to about 90 wt %, about 25 wt % to about 95 wt %, about 30 wt % to about 35 wt %, about 30 wt % to about 40 wt %, about 30 wt % to about 45 wt %, about 30 wt % to about 50 wt %, about 30 wt % to about 55 wt %, about 30 wt % to about 60 wt %, about 30 wt % to about 65 wt %, about 30 wt % to about 70 wt %, about 30 wt % to about 75 wt %, about 30 wt % to about 80 wt %, about 30 wt % to about 85 wt %, about 30 wt % to about 90 wt %, about 30 wt % to about 95 wt %, about 35 wt % to about 40 wt %, about 35 wt % to about 45 wt %, about 35 wt % to about 50 wt %, about 35 wt % to about 55 wt %, about 35 wt % to about 60 wt %, about 35 wt % to about 65 wt %, about 35 wt % to about 70 wt %, about 35 wt % to about 75 wt %, about 35 wt % to about 80 wt %, about 35 wt % to about 85 wt %, about 35 wt % to about 90 wt %, about 35 wt % to about 95 wt %, about 40 wt % to about 45 wt %, about 40 wt % to about 50 wt %, about 40 wt % to about 55 wt %, about 40 wt % to about 60 wt %, about 40 wt % to about 65 wt %, about 40 wt % to about 70 wt %, about 40 wt % to about 75 wt %, about 40 wt % to about 80 wt %, about 40 wt % to about 85 wt %, about 40 wt % to about 90 wt %, about 40 wt % to about 95 wt %, about 45 wt % to about 50 wt %, about 45 wt % to about 55 wt %, about 45 wt % to about 60 wt %, about 45 wt % to about 65 wt %, about 45 wt % to about 70 wt %, about 45 wt % to about 75 wt %, about 45 wt % to about 80 wt %, about 45 wt % to about 85 wt %, about 45 wt % to about 90 wt %, about 45 wt % to about 95 wt %, about 50 wt % to about 55 wt %, about 50 wt % to about 60 wt %, about 50 wt % to about 65 wt %, about 50 wt % to about 70 wt %, about 50 wt % to about 75 wt %, about 50 wt % to about 80 wt %, about 50 wt % to about 85 wt %, about 50 wt % to about 90 wt %, about 50 wt % to about 95 wt %, about 55 wt % to about 60 wt %, about 55 wt % to about 65 wt %, about 55 wt % to about 70 wt %, about 55 wt % to about 75 wt %, about 55 wt % to about 80 wt %, about 55 wt % to about 85 wt %, about 55 wt % to about 90 wt %, about 55 wt % to about 95 wt %, about 60 wt % to about 65 wt %, about 60 wt % to about 70 wt %, about 60 wt % to about 75 wt %, about 60 wt % to about 80 wt %, about 60 wt % to about 85 wt %, about 60 wt % to about 90 wt %, about 60 wt % to about 95 wt %, about 65 wt % to about 70 wt %, about 65 wt % to about 75 wt %, about 65 wt % to about 80 wt %, about 65 wt % to about 85 wt %, about 65 wt % to about 90 wt %, about 65 wt % to about 95 wt %, about 70 wt % to about 75 wt %, about 70 wt % to about 80 wt %, about 70 wt % to about 85 wt %, about 70 wt % to about 90 wt %, about 70 wt % to about 95 wt %, about 75 wt % to about 80 wt %, about 75 wt % to about 85 wt %, about 75 wt % to about 90 wt %, about 75 wt % to about 95 wt %, about 80 wt % to about 85 wt %, about 80 wt % to about 90 wt %, about 80 wt % to about 95 wt %, about 85 wt % to about 90 wt %, about 85 wt % to about 95 wt %, or about 90 wt % to about 95 wt %. In some examples, the amount of protein in the protein compositions described herein is from about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, or about 95 wt %.

In some embodiments, said protein used in the protein formulations comprises animal protein. In some instances, said animal protein is a protein from a marine animal. In some aspects, said animal protein is a protein from a fish. In some examples, the protein powder used in the protein formulations disclosed herein comprise protein from sardines, tuna, salmon, sharks, robalo, shrimp, octopus, and/or squid.

In some embodiments, said protein powder used in the present disclosure comprises a plant-based protein.

In some embodiments, the fish protein population comprises proteins from bonito, salmon, sardine, tuna, Alaskan pollack, yellowfin sole, shark, mackerel, cichlid fish, yellowstripe trevally, sardinelle, or hoki. In some embodiments, said fish protein population comprises proteins from bonito. In some embodiments, said fish protein population comprises proteins from salmon. In some embodiments, said fish protein population comprises proteins from sardine. In some embodiments, said fish protein population comprises proteins from tuna. In some embodiments, said fish protein population comprises proteins from Alaskan pollack. In some embodiments, said fish protein population comprises proteins from yellowfin sole. In some embodiments, said fish protein population comprises proteins from shark. In some embodiments, said fish protein population comprises proteins from mackerel. In some embodiments, said fish protein population comprises proteins from cichlid fish. In some embodiments, said fish protein population comprises proteins from yellowstripe trevally. In some embodiments, said fish protein population comprises proteins from sardinelle. In some embodiments, said fish protein population comprises proteins from hoki.

In some embodiments, said protein powder used in the present disclosure comprises a plant-based protein.

In some embodiments, the protein used in the protein formulations disclosed herein are water insoluble. In various embodiments, the protein in the protein formulation has a solubility of less than 50%, less than 40%, less than 30%, less than 20%, less than 15%, less than 10%, less than 7%, less than 5%, less than 3%, less than 2%, less than 1%, or less than 0.5% at a pH range of about 1-8, for example at a pH of 7. In some embodiments, the protein in the protein formulations disclosed herein are non-hygroscopic i.e. they do not adsorb moisture from the surrounding atmosphere.

In various embodiments, the protein used in the protein formulations disclosed herein comprises one or more essential amino acids, i.e. one or more amino acids selected from the group consisting of phenylalanine, valine, threonine, tryptophan, methionine, leucine, isoleucine, lysine, and histidine. In some embodiments, the protein used in the protein formulations disclosed herein comprises all essential amino acids. In some embodiments, the protein used in the protein formulations disclosed herein further comprises one or more non-essential amino acids, for example one or more of cysteine, aspartic acid, serine, glutamic acid, proline, glycine, alanine, tyrosine, and arginine. In some embodiments, the protein used in the protein formulations disclosed herein comprises all of phenylalanine, valine, threonine, tryptophan, methionine, leucine, isoleucine, lysine, histidine, cysteine, aspartic acid, serine, glutamic acid, proline, glycine, alanine, tyrosine, and arginine.

In some embodiments, the protein used in the protein formulations disclosed herein comprises less than 1 ppm of heavy metals, for example, less than 0.9 ppm, less than 0.8 ppm, less than 0.7 ppm, less than 0.6 ppm, less than 0.5 ppm, less than 0.4 ppm, less than 0.3 ppm, less than 0.2 ppm, less than 0.1 ppm or less than 0.05 ppm of heavy metals.

In some embodiments, the protein used in the protein formulations disclosed herein is non-hydrolyzed. In some examples, the protein in the protein formulations disclosed herein has a degree of hydrolysis of about 1% to about 50%. In some examples, the protein in the protein formulations disclosed herein has a degree of hydrolysis of at least about 1%. In some examples, the protein in the protein formulations disclosed herein has a degree of hydrolysis of at most about 50%. In some examples, the protein in the protein formulations disclosed herein has a degree of hydrolysis of about 1% to about 2%, about 1% to about 4%, about 1% to about 6%, about 1% to about 8%, about 1% to about 10%, about 1% to about 15%, about 1% to about 20%, about 1% to about 25%, about 1% to about 30%, about 1% to about 40%, about 1% to about 50%, about 2% to about 4%, about 2% to about 6%, about 2% to about 8%, about 2% to about 10%, about 2% to about 15%, about 2% to about 20%, about 2% to about 25%, about 2% to about 30%, about 2% to about 40%, about 2% to about 50%, about 4% to about 6%, about 4% to about 8%, about 4% to about 10%, about 4% to about 15%, about 4% to about 20%, about 4% to about 25%, about 4% to about 30%, about 4% to about 40%, about 4% to about 50%, about 6% to about 8%, about 6% to about 10%, about 6% to about 15%, about 6% to about 20%, about 6% to about 25%, about 6% to about 30%, about 6% to about 40%, about 6% to about 50%, about 8% to about 10%, about 8% to about 15%, about 8% to about 20%, about 8% to about 25%, about 8% to about 30%, about 8% to about 40%, about 8% to about 50%, about 10% to about 15%, about 10% to about 20%, about 10% to about 25%, about 10% to about 30%, about 10% to about 40%, about 10% to about 50%, about 15% to about 20%, about 15% to about 25%, about 15% to about 30%, about 15% to about 40%, about 15% to about 50%, about 20% to about 25%, about 20% to about 30%, about 20% to about 40%, about 20% to about 50%, about 25% to about 30%, about 25% to about 40%, about 25% to about 50%, about 30% to about 40%, about 30% to about 50%, or about 40% to about 50%. In some examples, the protein in the protein formulations disclosed herein has a degree of hydrolysis of about 1%, about 2%, about 4%, about 6%, about 8%, about 10%, about 15%, about 20%, about 25%, about 30%, about 40%, or about 50%.

The proteins in the protein formulations described herein have good digestibility. In some embodiments, the protein in the protein formulation has a digestibility coefficient of at least about 70%. In some embodiments, the protein in the protein formulation has a digestibility coefficient of at least about 80%. In some embodiments, the protein in the protein formulation has a digestibility coefficient of at least about 90%. In some embodiments, the protein in the protein formulation has a digestibility coefficient of at least about 95%. In some embodiments, the protein in the protein formulation has a digestibility coefficient of at least about 97%. In some embodiments, the protein in the protein formulation has a digestibility coefficient of at least about 98%. In some embodiments, the protein in the protein formulation has a digestibility coefficient of at least about 99%.

The proteins in the protein formulations described herein have good digestibility. In some embodiments, the protein in the protein formulation has a digestibility coefficient greater than about 70%. In some embodiments, the protein in the protein formulation has a digestibility coefficient of greater than about 80%. In some embodiments, the protein in the protein formulation has a digestibility coefficient of greater than about 90%. In some embodiments, the protein in the protein formulation has a digestibility coefficient of at greater than about 95%. In some embodiments, the protein in the protein formulation has a digestibility coefficient of greater than about 97%. In some embodiments, the protein in the protein formulation has a digestibility coefficient of greater than about 98%. In some embodiments, the protein in the protein formulation has a digestibility coefficient of greater than about 99%.

Fat

In various embodiments, the protein formulations disclosed herein also comprise fat. The fat content of the protein formulations is adjusted depending on the use. In some cases, higher fat compositions can be prepared. In other instances, lower fat compositions are desired. Any edible fat can be used in the protein formulations described herein.

In some embodiments, the fat is added to the protein formulations in the form of an oil. Oil may also provide a source of calories. The oil in the protein formulations may additionally improve the texture and/or mouthfeel of the protein formulations. Further, the oil may also aid in the functionality of the protein formulations. Non limiting oils that can be used in the protein formulations described herein include fish oil, palm oil, coconut oil, rapeseed oil, sunflower oil, peanut oil, cottonseed oil, palm kernel oil, olive oil, corn oil, hazelnut oil, linseed oil, rice bran oil, sesame oil, safflower oil, canola oil, flax seed oil, soybean oil, blubber, cod liver oil, mustard oil, walnut oil, lard pork fat, beef tallow, chicken fat, chia seed oil, and combinations thereof. In some embodiments, the oils used in the protein formulations described herein are omega-3 rich oils, for example canola oil, fish oil, flaxseed oil, mustard oil, soybean oil, and walnut oil. In some embodiments, the oils used in the protein formulations described herein is fish oil, for example omage-3 rich fish oil. In some embodiments, the fish oil used in the protein formulations described herein has a high omega-3 oil content, such as 50% or higher, 60% or higher, 70% or higher, 80% or higher, 90% or higher, or 95% or higher. Suitable fish oils include, but are not limited to, pilchard oil, menhaden oil, Peruvian fish oil, sardine oil, salmon oil, herring oil, and mackerel oil.

The oils used in the protein formulations described herein may be unsaturated, partially hydrogenated, or hydrogenated. In some embodiments, the amount of trans-fat in the protein formulations described herein is low. For example, the amount of trans fat in the protein formulations described herein may be less than 20%, less than 15%, less than 10%, less than 5%, less than 4%, less than 3%, less than 2%, less than 1%, less than 0.9%, less than 0.8%, less than 0.7%, less than 0.6%, less than 0.5%, less than 0.4%, less than 0.3%, less than 0.2%, less than 0.1%, or less than 0.05%.

System for Producing the Protein and Fat

The novel system and process will be discussed in greater detail below in view of the exemplary, non-limiting embodiments of the present invention. Each of the embodiments discussed hereinafter, unless expressly noted otherwise, are combinable and envisaged within the scope of the present invention. It is also understood that the embodiments, while preferred, are exemplary, and those of ordinary skilled in the art will understand certain modifications to the embodiments are possible without departing from the spirit of the invention.

FIG. 1 is a block diagram illustrating an exemplary embodiment of a recovery system 100 according to a first aspect of the present invention. According to FIG. 1, the recovery system 100 includes an animal tissue feedstock 101 for introducing animal tissue. The animal tissue feedstock may be contained within a storage tank. The storage tank may be temperature controlled. Alternatively, the animal tissue may be housed in a cold room and conveyed downstream for processing either manually by technicians, or by any combination of automatic machinery including but not limited to screw conveyers, conduits/tubes, pumps, blowers, etc. In an exemplary embodiment, 304SS piping may be employed throughout the system. In another exemplary embodiment, a pump constructed of stainless steel may be employed to assist with transferring animal tissue downstream.

The recovery system 100 also includes an organic solvent feed 102 for introducing organic solvent. The organic solvent feed 102 may be contained within a storage tank. The storage tank may have a flat bottom and/or a closed top. The storage tank may also include a level transmitter. The level transmitter preferably is constructed from stainless steel. The tanks may include ports which directly or indirectly communicate with an inlet of nitrogen gas. The storage tank may also include a conservation valve, butterfly valve, and/or diaphragm valve. The organic solvent may be delivered downstream by any combination of equipment including but not limited to piping, pumps, blowers, or the like, as described above. The pump may be stainless steel and centrifugal. Piping may be employed as necessary for interconnecting the process unit operation and downstream equipment.

The present invention involves a highly scalable process and is capable of yielding protein powder and omega 3 oils ranging from lower to higher quantities. The inventive process is also reconfigurable in that parallel trains of systems can be implemented for concurrent production requirements.

Of particular importance, the recovery system 100 also includes a single, unitary, integrated filter-dryer-reactor tank 110 (referred to as "the FDR tank" hereinafter) which receives animal tissue and organic solvent for processing. The FDR tank 110 includes vacuum and heating modules. The FDR tank also includes a filter for separating solids from heavy liquids. The FDR tank 110 also comprises one or more agitation devices that agitate or stir the animal tissue feedstock and solvent mixture, as well as a drying module for yielding dry solid protein product once separated from the liquid component (i.e., the water, oil, solvent). Preferably, the FDR tank 110 is constructed of stainless steel and is of a sanitary design. The FDR tank 110 will be described in greater detail below with reference to FIG. 2.

Figure 2:
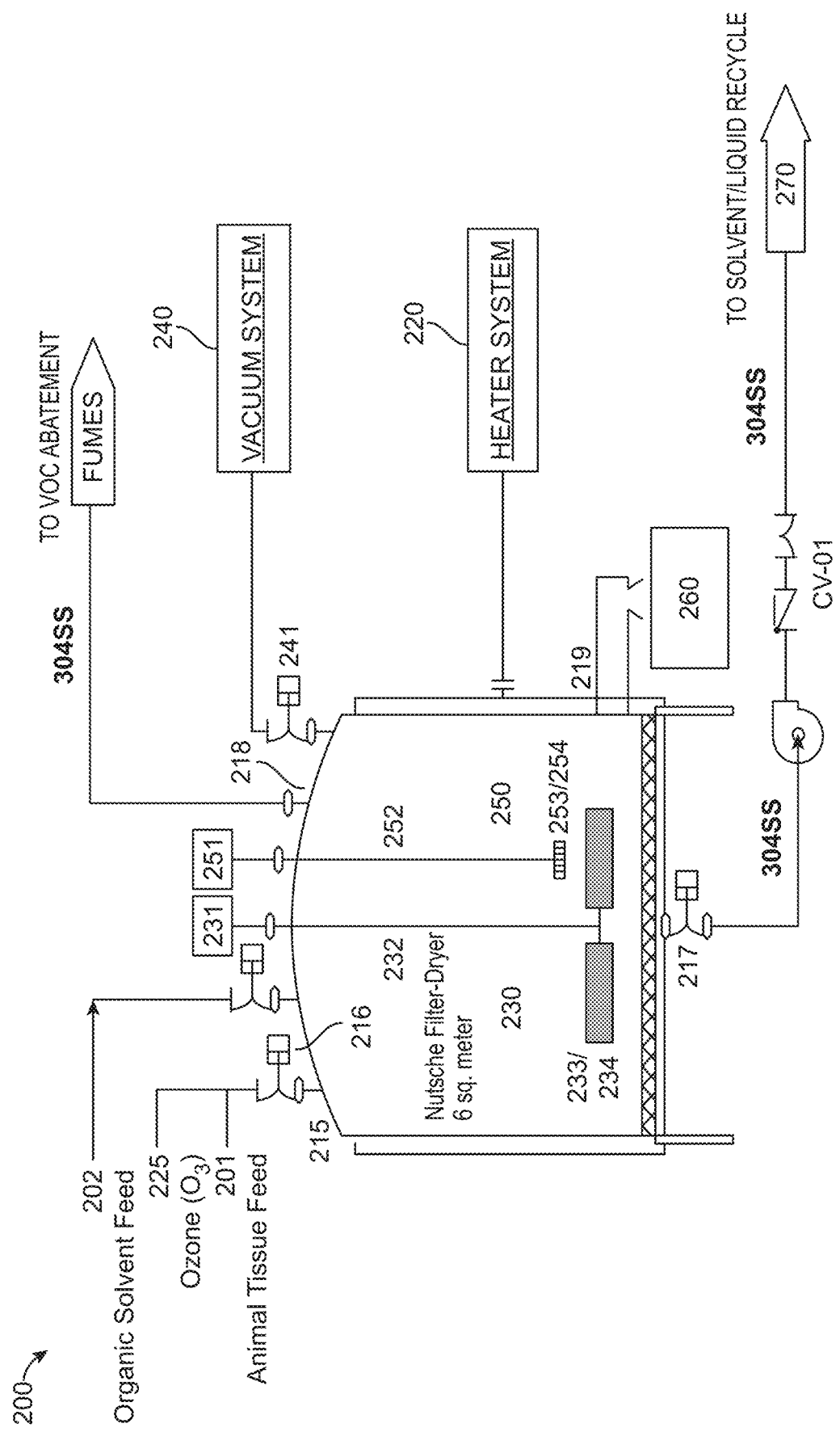
FIG. 2 is a cross-sectional view of a filter-dryer-reaction tank used to prepare the protein and fat for use in the formulations in accordance with exemplary embodiments of the present invention.

FIG. 2 is a cross-sectional view of the FDR tank 110 (also indicated by reference numeral 200 and used interchangeably throughout). The FDR tank 200 is an externally heated metal vessel, with agitation systems, capable of withstanding elevated pressures and vacuum compression vessel made of metal. Preferably the metal is selected from alloys suitable for sanitary processing requirements. More preferably, the metal is stainless steel. In another, exemplary embodiment, the FDR tank 200 generally is a monolithic or unitary structure capable of being pressurized and withstanding high levels of vacuum. That is, the FDR tank 200 is machined as a single piece rather than a collection of devices connected via conduits.

The FDR tank 200 may include a port 215 communicating directly or indirectly with a feed line for introducing animal tissue from the animal tissue feedstock 201 and/or a port 216 communicating directly or indirectly with a feed line for introducing organic solvent from the organic solvent feed 202. Ozone, preferably, is fed from an ozone generator 225 which may be located upstream or downstream of the animal tissue feed 201. The FDR tank 200 may also include a port 218 communicating directly or indirectly with a volatile organic content (VOC) recycling system that will be discussed later in detail. The FDR tank 200 also includes a port 219 communicating directly or indirectly with a solid product recovery tank 260, which is generally illustrated as "solid product recovery 160" in FIG. 1. The FDR tank 200 further includes a discharge port 217 communicating directly or directly with the Solvent/Liquid Recycle system (SLR system) 270 (which is identified in FIG. 1 as Solvent/Liquid Recycle System 170). Specifically, the SLR system recovers products from animal tissue including animal oils and water derived from the animal itself. The SLR system 270 also recovers organic solvent which may be recycled through the system according to user preferences. The FDR tank 200 may include a pump, a check valve (CV-01), and an isolation valve between the discharge port 217 and the SLR system 270. The check valve (CV-01) can prevent a reverse flow of liquid back from the SLR system 270 into the FDR tank 200.

Surrounding the FDR tank 200 is a heater system 220. In an exemplary embodiment, the outer walls and bottom of the FDR tank 200 are surrounded by a conventional heating jacket containing a heating medium. Generally, the heating medium is steam or alternative heating transfer fluid. Preferably, a steam boiler capable of operating at 6 MMBTU is employed.

The FDR tank 200 may include a primary agitator assembly 230. The primary agitator assembly 230 is located partially inside and partially outside the FDR tank 200. The agitator assembly 230 may include a drive means 231, which is, at least in part, preferably located outside of the FDR tank 200. In an exemplary embodiment, the drive means 231 is located on or above the FDR tank 200. The drive means 231 rotates a vertical, or near vertical shaft 232 which is located in or substantially within the FDR tank 200. The shaft 232 may be rotated, clockwise or counterclockwise, at variable speeds as determined by the operator. The rotation speeds have a variable range. The shaft 232 includes one or more arms 233 with corresponding blades 234 extending there from, which facilitate movement of the feedstock and solvent mixture within the FDR tank 200. The movement helps to ensure uniform heating and drying. The one or more arms 233 may be located at equal or non-equal distances from each another in the vertical and/or horizontal plane extending radially in the direction of the inner wall of the FDR tank 200. Each of the one or more blades 234 located on the one or more arms 233 also radially extends in the direction of the inner wall of the FDR tank 200 and is configured to rotate around the shaft axis. The one or more blades 234 may be located at equal or non-equal distances from each other. The blades 234 may take on a number of shapes; however, the blades are preferably rectangular or substantially rectangular. Further, the blades 234 may include a radially inner portion that is substantially flat and lies substantially in a vertical plane. Alternatively, the blades 234 may lie with a positive or a negative pitch. In yet another exemplary embodiment, one or more of the blades may include a heating mechanism to provide an enhanced method of drying the solid protein product. The heating mechanism may b e a part of the heating system 220.

In a separate embodiment, microwave radiation may be employed as an alternate method for drying the solid product. Microwave radiation has been shown to provide more uniform drying while reducing damage to the product otherwise due to conventional heating mechanisms.

The FDR tank 200 may include a secondary agitator assembly 250. Like the primary agitator assembly 230, the secondary agitator assembly 250 is preferably located partially inside and partially outside of the FDR tank 200. The secondary agitator assembly 250 may b e a high shear agitator for facilitating mass transfer during the reaction phase of a mixture in the FDR tank 200. The secondary agitator assembly 250 includes a driver 251 that is, at least in part, preferably located outside of the FDR tank 200. It communicates with a rotatable shaft 252, which is preferably located inside or substantially inside the vessel 210. The shaft 252 may include one or more arms 253 and one or more corresponding blades 254. Although the secondary agitator assembly 250 appears to be arranged in FIG. 2 in a vertical orientation, it may, in the alternative, be arranged at any angle relative to the FDR tank 200.

Preferably, the FDR tank 200 also includes a vacuum system 240 capable of drawing a vacuum within the FDR tank 200. The vacuum system 240 includes a vacuum pump 241 to reduce the air pressure in the FDR tank 200.

Discharge of the final bulk solids from the FDR is preferably accomplished by using a pneumatic conveying system. This system avoids the need for manual removal of the product from the FDR. The pneumatic conveying system facilitates discharge of the solid protein product from the FDR to a final bulk container, such as a tote bind or a high strength woven sack.

The FDR system is a highly automated system that utilizes a state of the PLC (Programmable Logic Controller) or similar logic processor. High speed input and output signals are integrated as part of the automation to permit the control system to rapidly respond to process deviations and automatically return the process to within specification. The complex mechanical nature of the FDR requires critical safety interlocks, and the automated system's logic processor scans these conditions on a continual basis to ensure that the FDR equipment and auxiliaries are protected. Customized programming of the logic processor permits the implementation of various software library modules that can be deployed depending on the requirements of the process. For example, different animal tissue feed stocks may require slightly different processing conditions in order to yield high quality protein product. The nature of the automation process will permit the implementation of a recipe driven system that can be tailored to various feed stocks and related processing conditions.

In another embodiment, the automated system used for the production of protein shall conform to a hierarchical model that combines process automation with Business Intelligence (BI) involving Manufacturing Execution Systems (IVIES) encompassed by an overarching Enterprise Resource Planning (ERP) system. The Instrumentation, Systems and Automation (ISA) S95 standard establishes a four tier hierarchical model for a manufacturing enterprise network. It characterizes generic application software and network architectures for manufacturing control systems as described under Table 1. The primary protein production process occurs at Level 0 with Level 1 instrumentation that monitors the process operating parameters within specification. Level 2 comprises the logic controllers, which may include a combination of PLC, DCS or SCADA systems. These Level 2 logic processors contain the proprietary source code and application recipes that define the protein production process. Since the Enterprise Control System is by definition a networked structure, information and data derived from the process and Levels 1 and 2 are transferred to Level 3 material planning and quality systems. Level 3 is the repository for raw material and finished goods analytical data as well as inventory levels. Level 4 is the final repository for all information related to the protein manufacturing operations. Level 4 analyzes internal manufacturing data and couples it against external marketing a forecasting information in order to optimize the schedule, raw material usages, and finished goods inventories.

TABLE 1

SA95 Enterprise Control System Integration Hierarchy

| SA95 Layer | Function | Description |
|---|---|---|
| Level 4 | ERP | Enterprise Resource Planning |
| | CRM | Customer Relationship Management |
| | APO | Advance Planning Optimization |
| Level 3 | MES | Manufacturing Execution Systems |
| | LIMS | Laboratory Information Management Systems |
| | CMMS | Calibration Maintenance Management Systems |
| | WMS | Warehouse Management Systems |
| Level 2 | PLC | Programmable Logic Controllers |
| | DCS, BAS | Distributed Control Systems, Building Automation Systems |
| | SCADA | Supervisory Control and Data Acquisition |
| Level 1 | Devices | Process measurements and terminal control equipment |
| Level 0 | Process | The physical manufacturing process |

Figure 3:
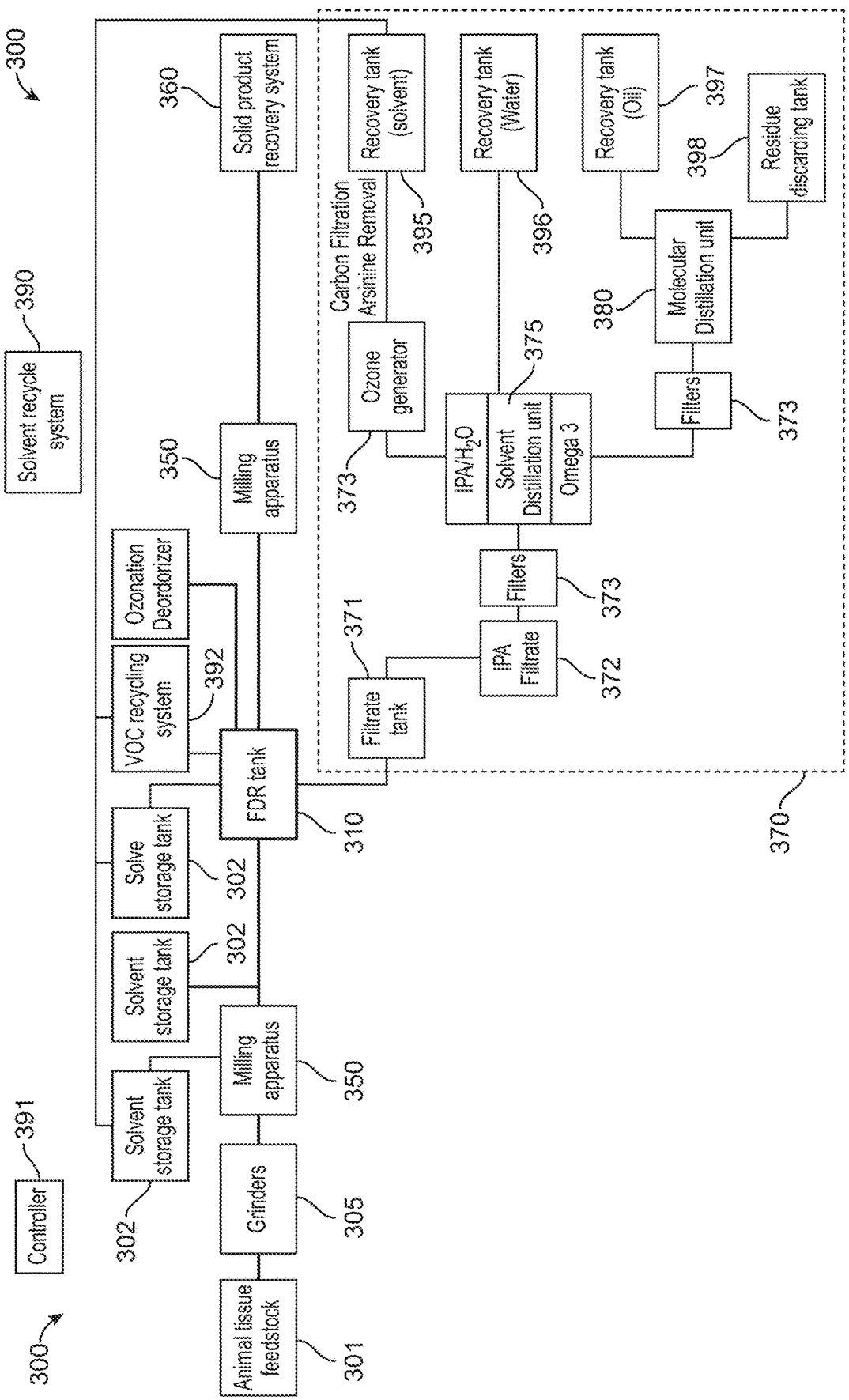
FIG. 3 illustrates a recovery system for recovering protein powder meal and omega-3 oil used in the formulations described herein in detail in accordance with exemplary embodiments of the present invention.
Figure 4:
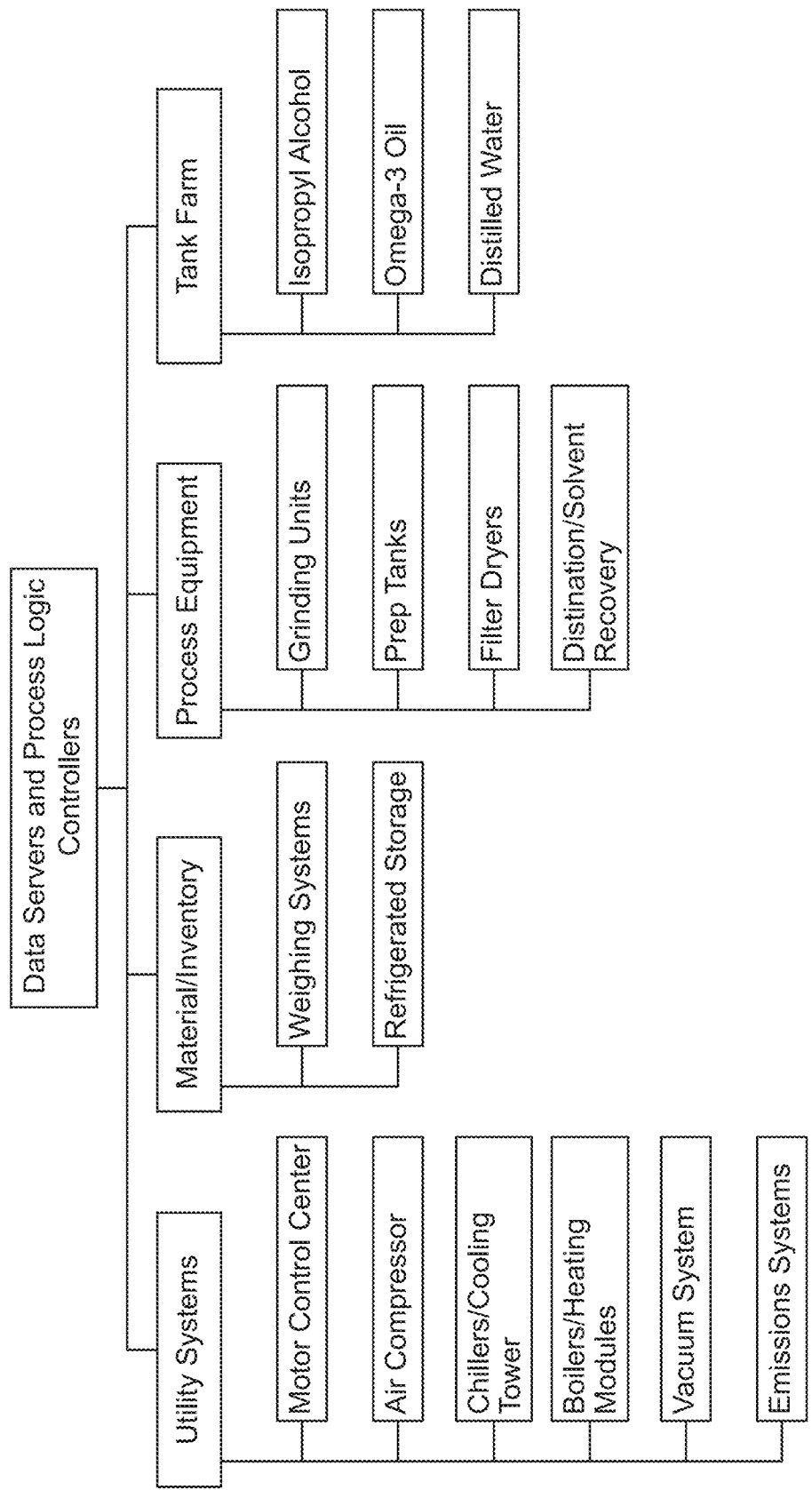
FIG. 4 illustrates functional hierarchy associated with the automation and control system network for the plant level unit operations are for controlling and operating the protein manufacturing plant in detail in accordance with exemplary embodiments of the present invention.
Figure 5:
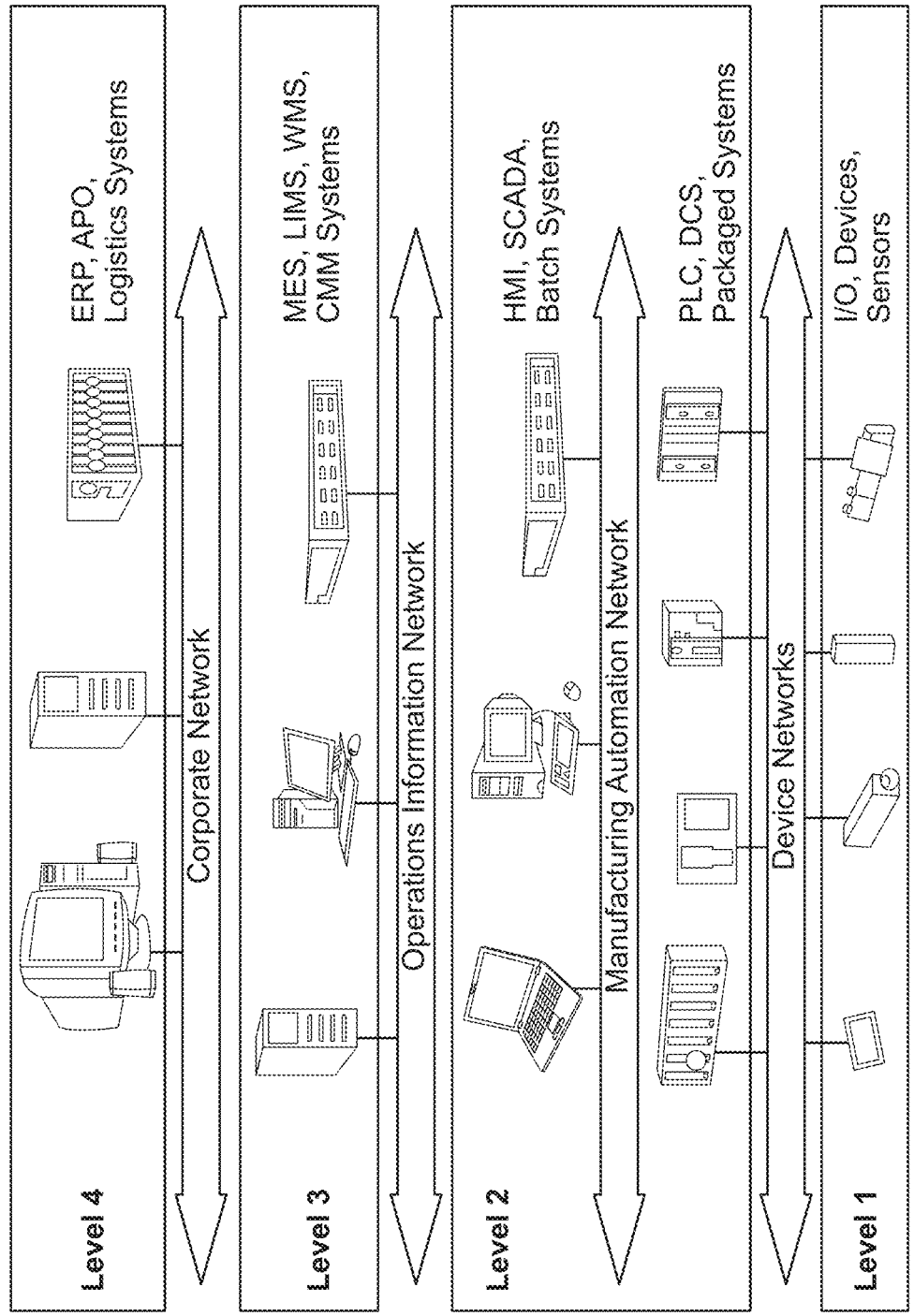
FIG. 5 illustrates the SA95 object model hierarchy associated with the Enterprise Resource Planning (ERP) system that depicts a vertical transaction model between the detailed production systems and corporate planning systems in detail in accordance with exemplary embodiments of the present invention.

FIG. 3 illustrates a recovery system 300 (also indicated by reference numeral 100 and used interchangeably throughout) in greater detail in accordance with exemplary embodiments of the present invention. More particularly, FIG. 3 illustrates the SLR system 370 in detail (also indicated by reference numeral 370 in FIG. 2 and used interchangeably throughout). In addition to the detailed features illustrated in FIG. 3, the recovery system 300 may further include such features as air compressors and nitrogen systems, for example, to maintain an inert environment inside the aforementioned filtration and storage tanks, depending on the type of organic solvent(s) used. The recovery system 300 may also employ sensors for detecting explosive conditions and corresponding alarms to indicate, for example, that the concentration of organic solvent vapors exceed permissible threshold limits.

Turning attention back to FIG. 3, the SLR system 370, as mentioned, comprises a filtrate tank 371, although more than one tank is conceivable (see filtrate tank 372). The filtrate tank 371 may be located upstream of one or more filters 373. The filters 373 help remove residual solids from the filtrate (i.e., the solvent, liquid and oil mixture). The filters 373 may be located anywhere in the SLR system 370 as required for the removal of the residual solids.

The SLR system 370 may also include a distillation unit 375, such as a fractional distillation tower or WFE (wiped film evaporator). Distillation unit 375 operates to recover fats/oils from the organic solvent/water. Distillation unit 375 may be located downstream of the filtrate tank 371. Pumps and blowers may be employed as necessary for transferring the various liquids downstream for further processing. The SLR system 370 may include more than one distillation unit, if needed.

The SLR system 370 preferably includes an ozone generator 374. As shown in FIG. 3, the ozone generator 374 is located downstream of the filtrate tank 371, and it reacts with and neutralizes amines in the filtrate, thereby eliminating the odor (e.g., fishy odor) associated with the amines. Odors associated with fish are due to the natural process of decay. Bacterial enzymes attack the flesh of fish, and this triggers an oxidation reduction reaction. The muscle of the fish which contains trimethylamine oxide (TMAO) breaks down by decomposition, thus producing trimethylamine and dimethylamine. These two amines give rise to the characteristic fishy odor. Thus, the ozone removes this odor by destroying the molecules, bacteria, and spores that cause unpleasant smells. Triatomic oxygen is ozone. In a reverse reaction using Ozone, the third oxygen atom attaches itself to the amine molecules and ultimately renders them odorless. The ozone generator 374 can be also located at other part of the SLR system 370 where deodorization is needed.

Deodorization of the solvent and liquid products is further achieved through the use of in-line activated carbon filters. Activated carbon is a well-established material for removal of organic contaminants from a process stream. The benefit of using activated carbon in the SLR process is that trace amines are further eliminated along with the associated odor attributed to the fishy amine smell.

The SLR system 370 may include condensers downstream of the distillation unit 375 to recover water and organic solvent. Further processing equipment may be required as necessary to obtain purified water. The purified water may then be transferred to a recovery tank 396.

The SLR system 370 may further include one or more distillation units 380 to recover purified animal oil (e.g., omega-3 oil). Preferably, the distillation unit 380 may contain a phase separation apparatus. The distillation unit 380 is located downstream of the distillation unit 375. The distillation unit 380 generally separates the animal oil from waste solid fat. The distillation unit 380 may, for example, be a Thin Film Evaporator (TFE), Wiped Film Evaporator (WFE) or a molecular distillation unit. Specifically, a molecular distillation unit, may be employed to recover a purified omega-3 oil from waste solid fat. Various grades of purity may be achieved and techniques readily known in the art may be employed to achieve a final grade of omega-3 oil. Oil may be transferred to a recovery tank 397 while residues are captured in a tank 398.

Referring back to FIG. 3, recovery system 300 may include a controller 391. The controller 391 may include an electrical motor control center. The controller generally provides the operator with an interface through which the operator can achieve real-time, automated control over the various components and subsystems that make up recovery system 300. The controller 391 may, for example, communicate with and/or provide control over tank volumes, temperatures, device states, sensors and alarms.

The system 300 may further include one or more grinders 305. The grinders 305 are preferably made of stainless steel construction and configured to grind raw animal tissue feedstock, such as fish, into ¼" to ½" cube sizes. The grinders 305 are located upstream of the FDR tank 310, such that the grinders 305 grind animal tissue feedstock received from the animal tissue feedstock storage tank/room 301 into smaller particles, as specified above, for further processing.

After the animal tissue feedstock is ground, the feedstock may be combined with an organic solvent for preparing a homogenized slurry or mixture. As shown in FIG. 3, system 300 includes preparation tanks 330 for combining the animal tissue feedstock and the organic solvent. The preparation tank 330 preferably processes up to 50 gpm. The preparation tank 330 may be a heated agitated tank. The preparation tank 330 is also located upstream of the FDR tank 310. Level sensors and flowmeters may be employed in or associated with the preparation tank 330, in order to provide feedback information to the operator through controller 391, to help ensure adequate flow in accordance with operator preferences.

System 300 may also comprise a milling apparatus 350 and a solid product recovery system 360. The milling apparatus 350 mills the solid product to obtain a granular or powder form of the recovered solid protein. The milled product may further be cured in an oven. After curing, the finished product is stored in a final product storage facility. Upon completion of these processes, the product with all of its protein properties can be managed in such a way so as to give it physical characteristics sufficient to allow it to be consumed and ingested by children and adults easily and without unpleasant flavors or odors which have a disagreeable impact or which give rise to rejection. For example, without limitation, the powder may be pressed into a solid pill form, placed in a capsule to be swallowed, or added to a liquid and consumed as a beverage. The recovered solid protein may then be collected by the solid product recovery system 360.

Recovery system 300 also comprises an organic solvent recycle system 390. Preferably, the solvent is isopropyl alcohol (IPA); however, it will be readily apparent to those skilled in the art that solvents other than IPA may be used. As mentioned above, the organic solvent may be distilled from the water by use of a heated still and condensers. However, once the solvent is removed from the water, the solvent may be transported back to a solvent storage tank 302. This recycled organic solvent may or may not be combined with new or fresh solvent prior to being transferred to the FDR tank 310, where it will be combined with re-filtered wet cake, or transferred to preparation tank 330, where it will be combined with the animal tissue. Re-filtered wet cake is the residual solid protein product that remains behind in the FDR following each reactor recycle process. Recall that once the raw fish/IPA mixture is sent to the FDR tank 310. IPA is then filtered off and the filtrate is transferred to the solvent recovery system. Solid protein product remains behind in the FDR tank 310. Another charge of IPA is then sent to the FDR tank 310 where the solid protein product undergoes a second reactor/heating/filtration cycle. IPA is once again filtered off leaving behind the solid protein "wet cake". This recycle process is conducted one more time for a total of 3 times. In general, the total number or recycles will range from 1 to 4, and is determined by the final product desired quality. The FDR tank 310 and preparation tank 330 may receive one of the following with respect to organic solvent: entirely new (fresh) organic solvent, entirely recycled organic solvent, or a combination thereof. As is apparent, the solvent recycle system 390 includes piping, as described above, for transporting the organic solvent between the solvent recovery tank 395 of the SLR system 370, the organic solvent storage tank 302 and the FDR tank 310.

The recovery system 300 may include a recovery tank 396 for collecting water, a recovery tank 397 for collecting oils, including omega-3 fatty acids, and a residue discarding tank 398 for collecting residue. Still further, recovery system 300 comprises a VOC recycling system 392 for capturing emissions of fumes/vapors formed in the FDR tank 310. As shown in FIG. 3, for example, emissions exit the vessel FDR tank 310 via a port, and the vapors may be transferred to a fume condenser and chiller for condensing the vapors into usable organic solvent. The condensed organic solvent may be transferred via a solvent recycle line to the organic storage tank 302 for reuse.

Process for Producing the Protein and Fat

According to an aspect of the present invention, a process is described for recovering products originally derived from animal tissue. In one embodiment, solid protein product is recovered. In another embodiment, solid protein product in addition to water derived from animal tissue are recovered. In a further embodiment, solid protein product, water and animal oil derived from the animal tissue are recovered. In some embodiments, the protein product derived herein is the protein used for the protein formulations described herein.

Animal tissue, for the purposes of this application, is defined as having eukaryotic cells of various shapes and sizes. Animal cells are further characterized as excluding cell walls which are present in all plant cells. The animal tissue may include but is not limited to land and marine animals such as insects, fish, poultry and red meat. In an exemplary embodiment, the animal tissue feedstock contains fish. In yet another exemplary embodiment, animal tissue feedstock is maintained at temperatures less than 50° F., preferably less than 45° F., and more preferably less than or equal to 40° F., prior to being processed by the purification system of this invention.

As stated, the animal tissue may be fish, and in particular, raw fish. The raw fish should be fresh and handled in a sanitary manner. The quality of the raw material should also be verified. The fish is also ground, as explained above (see e.g., mill 350), into pieces so as to form a fishmeal prior to mixing with organic solvent and further processing.

An organic solvent is generally employed in the process. The solvent may include an alcohol, wherein the hydroxyl functional group is bonded to a carbon atom. In an alternative embodiment, the solvent may be selected from those organic solvents with a VOC ranging between about 200-500 g/L. In still another alternative embodiment, the solvent is selected such that it meets VOC regulations promulgated by local governing authority. In a preferred embodiment, the solvent, as stated, is IPA (isopropyl alcohol).

A mixture of fishmeal and solvent is initially heated; however, a low heat is preferably used so there is no risk of decomposition of the protein product due to thermal degradation. The mixture of fishmeal and solvent should sufficiently be balanced so that the fishmeal dissolves into a viscous liquid during processing in the FDR tank, and in particular, the heating process, which is done at a controlled temperature by means of a variable control system that prevents the destabilization of the which, in turn, would reduce or eliminate the potency of the protein. The ratio of animal tissue to solvent will, of course, depend on various factors including but not limited to the specific animal tissue and solvent used. Where the animal feedstock is raw fish and IPA is employed as the organic solvent, the ratio of fish in kilograms to IPA in liters ranges between about 1:1 to 1:2.2; 1:2.1; 1:2.0; 1:1.9; 1:1.8; 1:1.7; 1:1.6; 1:1.5; 1:1.4; 1:1.3; 1:1.2; and 1:1.1. More preferably the ratio is about 1:2. In a preferred, commercial embodiment of the present invention, upon scale-up, about 5,000 Kg of raw fish and about 10,000 L of organic solvent are combined to form the mixture of fishmeal and solvent.

As illustrated in FIGS. 1-3, the mixture of animal tissue and organic solvent is fed, e.g., via a screw conveyer from the preparation tank (e.g., see preparation tank 330) to the FDR tank (see e.g., FDR tank 310), where it is heated, with agitation at a temperature ranging between 45-75° C. for approximately 2 hours in the FDR tank. The primary agitator assembly, as discussed above, ensures uniform heating and prevents decomposition of the animal tissue and organic solvent mixture, particularly that portion of the mixture in proximity of the walls or bottom of the compression vessel.

In doing so, protein with a high concentration is recovered, specifically with 85% or higher pure protein, as characterized through a complete aminogram. An aminogram is a collection of amino acids present in a product depending on the type of animal tissue. The recovered protein may be a complete aminogram, non-hygroscopic, and substantially free, of fish odor or smell contributed by amines. The recovered protein may also be non-hygroscopic and sterile, and visually, the protein, may exhibit a cream color.

The animal tissue may be fed by a screw conveyer to a preparation tank (see e.g., preparation tank 330). The organic solvent is then added to ensure an adequate mixture is formed prior to being fed to the FDR tank (see e.g., FDR tank 3). The preparation tank may also include an agitator, as well as a jacketing and insulation system to permit external heating and cooling. Preferably, the mixture is heated to a temperature not exceeding 75° C., for example, about 45-50° C. The resulting homogeneous mixture is then fed to the FDR tank.

In the FDR tank, the homogeneous mixture is again heated and agitated, then filtered. The residual protein wet-cake is then dried, preferably using heat and vacuum or microwave. By so doing, several unit operations are condensed into a single piece of equipment. Namely, slurry vessels, product centrifuges/filtering mechanisms, stand-alone drying apparatuses, along with accompanying valves, conduits, blowers, pumps, sensors, controllers, and the like, that assist with the transfer of the mixture between each operation are not required. As a result, production cycle time for recovering product, such as for example solid protein, significantly is reduced. Within the FDR tank, the process generally is automated and operates in closed circuit, e.g., closed system.

After the mixture is heated and agitated for a period of approximately 2 hours, as mentioned above, the FDR tank operates in a filtration mode. The filtrate including the organic solvent is discharged from the FDR tank to the SLR system. A wet cake is retained in the FDR tank. The FDR tank then operates in heating/drying mode under full vacuum at a temperature not exceeding 80° C., for example, from about 50-80° C. for 1 hour to 10 hours to recover solid.

After filtration, one or more heating, agitation and filtration cycles may be employed. For each additional heating, agitation and filtration cycle, organic solvent is fed into the FDR tank. As explained above, the solvent may be new (fresh) solvent, recycled solvent recovered from the SLR system, or a combination of both. The recycled solvent may be transferred from the SLR system through the use of a solvent recycle system (see e.g., solvent recycle system 390) to the solvent storage tank (see e.g., solvent storage tank 302), thus promoting green manufacturing initiatives. After the above-mentioned one or more heating, agitation and filtration cycles, the FDR tank operates in heating/drying mode under full vacuum at a temperature ranging from about 50-80° C. for 1 hour to 10 hours to dry and recover solid protein from the solid portion of the mixture retained in the FDR tank.

The recovered solid protein is ultimately discharged from through an outlet port in the FDR tank to a storage tank. The solid protein may be reviewed and analyzed by quality control to ensure adequate yield of protein. In an exemplary embodiment, the solid protein is present in a yield of about 15-25 wt. % based upon the animal tissue entering the FDR tank 110. Preferably, the yield is greater than about 18 wt. % solid protein recovered from animal tissue entering the FDR tank 110.

A laboratory analysis of the recovered solid protein from the system exhibited protein concentrations in the range of about 85-95%. The quality of the final product is generally excellent at least because the product is not degraded as the process is low temperature, e.g., not generally exceeding 80° C., in order to prevent thermal degradation of the protein. Hence, the organoleptic structure is maintained resulting in a relatively complete amino gram on the high quality concentration of protein on the final product. The product exceeds all FDA requirements for a supplement and is an excellent product for world food needs. The 35 gram serving provides sufficient protein to meet a person's amino acid requirement like a full meal. The most frequently used methods for making these determinations at the protein level, are electrophoresis and thin layer chromatography; and it has been possible to demonstrate that there exists at least one specific protein for each species.

The recovered protein also has a long shelf life defined as maintaining a fairly constant profile over a long period of time. In one embodiment, the recovered solid protein product was tested in a laboratory simulating environmental conditions over 10 years. The constant profile may be attributed to the product's non-hygroscopic, or substantially non-hygroscopic nature. That is, the recovered, solid protein does not absorb humidity or grow any bacteriological processes in view of the low moisture content. Preferably the moisture content is less than about 8 wt. % of the recovered, solid protein.

The recovered protein has amino acid compositions that are balanced to afford a nutritionally advantageous characteristic. The recovered protein may also be sufficiently stable and sterile, i.e., substantially or entirely 100%.

Further, in accordance with the process of the present invention, the filtrates (i.e., the heavy liquids) that are extracted as a result of the filtering in the FDR tank is transferred to the SLR. The filtrate may include but is not limited to oils, fats, solvent and water. When the animal tissue is fish, the oil may include omega-3 fatty acids. In the SLR system, the filtrate may first be transferred to a filtrate tank (see e.g., filtrate tank 371), and subsequently filtered once again (see e.g., filter 373) to remove residual solids. Alternatively, the filtrate may directly be transferred to a solvent recovery or distillation tower (see e.g., distillation unit 375), in order to separate the organic solvent/water from oils/fats. As previously stated, the solvent may be transferred to a recovery tank 395, and thereafter, employed as recycled organic solvent. The water may be transferred to a recovery tank 396 and purified further as necessary.

The recovered oils, for example, omega-3 fatty acids, may be filtered to remove residue (see e.g., filter 373) and to increase the purity thereof. It may also be treated with ozone to remove the odor by neutralizing any amines present in the oil. The residue may be transferred to a discarding tank (see e.g., residue discard tank 398). The oils, including omega-3 fatty acids, may be transferred to a first recovery tank (see e.g., recovery tank 397). There, the oil may undergo further purification, as required, according to a further embodiment and transferred to another recovery tank 397b. The recovered oils including omega-3 fatty acids are polyunsaturated fatty acids with a double bond on the end of the carbon chain. They are considered essential fatty acids. Humans cannot readily make omega-3 fatty acids in their bodies, and therefore it must be obtained from other sources since they play an important role for normal metabolism.

In an exemplary embodiment, omega-3 fatty acids are recovered in amounts greater than or equal to about 5% of the original animal tissue feedstock (whereby 1 L=0.96 Kg).

Preferably omega-3 fatty acids are recovered in amounts of greater than or equal to 6% of the original animal tissue feedstock, more preferably, omega-3 fatty acids are recovered in amounts greater than or equal to 7% of original animal tissue feedstock. [81 1 L/2*0.96=389 kg].

In yet another embodiment, the organic solvent/water may independently be recovered by employing extractive distillation. Namely, a third component is introduced into the process. For example, when isopropyl alcohol (IPA) is the organic solvent, diisopropyl ether (IPE) may be employed whereby IPA and IPE combine to completely separate water therefrom. The water is recovered at outlet 396 and may be further subjected to another ozone treatment. In still another exemplary embodiment, distilled water is recovered in amounts less than or equal to about 35% of the initial liquids portion entering the SLR system 37. Preferably, water is recovered in amounts less than or equal to about 30% of the liquids portion entering the SLR system 370. More preferably, water is recovered in amounts less than or equal to about 25% of the liquids portion.

On the other hand, the IPA/IPE mixture is then further distilled in a secondary distillation column to recover IPA. The IPA may be transferred to a recovery tank 395 for further processing as discussed above.

Carbohydrates

In various embodiments, the protein formulations described herein also comprise carbohydrate. In various embodiments, the carbohydrates in the protein formulations may provide calories and/or act as a bulking agent. In some embodiments, the carbohydrates can also provide a smooth mouthfeel to the composition. The carbohydrate content of the protein formulation can be from about 5 wt. % to about 95 wt. % based on the total weight of the composition. In some embodiments, the carbohydrate content of the protein formulation can be from about 10 wt % to about 90 wt %. In some embodiments, the carbohydrate content of the protein formulation can be from at least about 10 wt %. In various embodiments, the carbohydrate composition can be from at most about 90 wt %. In various embodiments, the carbohydrate composition can be from about 10 wt % to about 15 wt %, about 10 wt % to about 25 wt %, about 10 wt % to about 30 wt %, about 10 wt % to about 35 wt %, about 10 wt % to about 40 wt %, about 10 wt % to about 45 wt %, about 10 wt % to about 50 wt %, about 10 wt % to about 60 wt %, about 10 wt % to about 70 wt %, about 10 wt % to about 80 wt %, about 10 wt % to about 90 wt %, about 15 wt % to about 25 wt %, about 15 wt % to about 30 wt %, about 15 wt % to about 35 wt %, about 15 wt % to about 40 wt %, about 15 wt % to about 45 wt %, about 15 wt % to about 50 wt %, about 15 wt % to about 60 wt %, about 15 wt % to about 70 wt %, about 15 wt % to about 80 wt %, about 15 wt % to about 90 wt %, about 25 wt % to about 30 wt %, about 25 wt % to about 35 wt %, about 25 wt % to about 40 wt %, about 25 wt % to about 45 wt %, about 25 wt % to about 50 wt %, about 25 wt % to about 60 wt %, about 25 wt % to about 70 wt %, about 25 wt % to about 80 wt %, about 25 wt % to about 90 wt %, about 30 wt % to about 35 wt %, about 30 wt % to about 40 wt %, about 30 wt % to about 45 wt %, about 30 wt % to about 50 wt %, about 30 wt % to about 60 wt %, about 30 wt % to about 70 wt %, about 30 wt % to about 80 wt %, about 30 wt % to about 90 wt %, about 35 wt % to about 40 wt %, about 35 wt % to about 45 wt %, about 35 wt % to about 50 wt %, about 35 wt % to about 60 wt %, about 35 wt % to about 70 wt %, about 35 wt % to about 80 wt %, about 35 wt % to about 90 wt %, about 40 wt % to about 45 wt %, about 40 wt % to about 50 wt %, about 40 wt % to about 60 wt %, about 40 wt % to about 70 wt %, about 40 wt % to about 80 wt %, about 40 wt % to about 90 wt %, about 45 wt % to about 50 wt %, about 45 wt % to about 60 wt %, about 45 wt % to about 70 wt %, about 45 wt % to about 80 wt %, about 45 wt % to about 90 wt %, about 50 wt % to about 60 wt %, about 50 wt % to about 70 wt %, about 50 wt % to about 80 wt %, about 50 wt % to about 90 wt %, about 60 wt % to about 70 wt %, about 60 wt % to about 80 wt %, about 60 wt % to about 90 wt %, about 70 wt % to about 80 wt %, about 70 wt % to about 90 wt %, or about 80 wt % to about 90 wt %. In various embodiments, the carbohydrate composition can be from about 10 wt %, about 15 wt %, about 25 wt %, about 30 wt %, about 35 wt %, about 40 wt %, about 45 wt %, about 50 wt %, about 60 wt %, about 70 wt %, about 80 wt %, or about 90 wt %.

Non limiting examples of the carbohydrates that can be used in the protein formulations described herein include rye carbohydrates, barley carbohydrates, corn carbohydrates, cassava carbohydrates, oat carbohydrates, rice carbohydrates, millet carbohydrates, sorghum carbohydrates, tapioca carbohydrates, or a combination thereof. In some examples, the carbohydrates can be selected from corn, nuts, barley, bulger, pasta, parboiled rice, dried legumes, or mixtures thereof. In some embodiments, the carbohydrates comprise barley carbohydrates.

In some embodiments, the carbohydrates in the protein formulations comprise complex carbohydrates. For example, greater than 10%, 15%, 20%, 30%, 40%, 50%, 60%, 70%, 80%, 90%, 95%, 97%, 98%, 99%, or 99.5% of the carbohydrates in the protein formulations are complex carbohydrates. In some embodiments, the carbohydrates in the protein formulations also comprise fiber. In some embodiments, the protein formulations comprise complex carbohydrates from barley and optionally include fiber.

Vitamins

In various embodiments, the protein formulation of the present disclosure may further comprise one or more vitamins. Non limiting examples, of the vitamins that may be present in the protein formulations described herein include vitamin A (including retinol, retinal and retinoic acid, as well as provitamin carotenoids such as beta-carotene), vitamin B (including thiamin (vitamin B1), riboflavin (vitamin B2), niacin (vitamin B3), pantothenic acid (vitamin B5), pyridoxine (vitamin B6), biotin (vitamin B7), folate (vitamin B9), and cobalamin (vitamin B12), vitamin C (ascorbic acid), vitamin D (including vitamin D3 (cholecalciferol) and vitamin D2 (ergocalciferol)), vitamin E (including alpha-tocopherol), and vitamin K (including vitamin $K_1$ or phylloquinone, vitamin K2, and vitamin K3 or menadione).

In some embodiments, the protein formulations comprise all of vitamin A, vitamin B1, vitamin B2, vitamin B3, vitamin B5, vitamin B6, vitamin B7, vitamin B9, vitamin B12, vitamin C, vitamin D, vitamin E, and vitamin K.

In some embodiments, the one or more vitamins may be present in nutritionally relevant amounts, which means that a serving of protein formulations provide a nourishing amount of said vitamins. In some embodiments, this amount comprises at least about 1% of the U.S. RDA (Recommended Dietary Allowances) or RDI (Reference Daily Intake) for these vitamins. In some embodiments, this amount comprises from about 1% of the U.S. RDA or RDI to about 100% of the U.S. RDA or RDI. In some embodiments, this amount comprises from about 10% to about 100% of the U.S. RDA or RDI, about 20% to about 100% of the U.S. RDA or RDI, about 30% to about 100% of the U.S. RDA or RDI, about 40% to about 100% of the U.S. RDA or RDI, about 50% to about 100% of the U.S. RDA or RDI, about 60% to about 100% of the U.S. RDA or RDI, about 70% to about 100% of the U.S. RDA or RDI, about 80% to about 100% of the U.S. RDA or RDI, about 90% to about 100% of the U.S. RDA or RDI, about 92% to about 100% of the U.S. RDA or RDI, about 94% to about 100% of the U.S. RDA or RDI, about 96% to about 100% of the U.S. RDA or RDI, about 98% to about 100% of the U.S. RDA or RDI, or about 99% to about 100% of the U.S. RDA or RDI. Of course, it is recognized that the preferred daily intake of any vitamin may vary with the user, with greater than the U.S. RDA or RDI intakes being beneficial in some circumstances.

Emulsifiers

In some embodiments, the protein formulations of the present disclosure further comprise an emulsifier. In some instances, an emulsifying agent aids in binding the fat and minimizing oil separation in the protein formulation. The emulsifying agent can be the product of an esterification of a diglyceride and glycerol, a lecithin, a monoglyceride or a diglyceride of a fatty acid ester, a monoglyceride of a fatty acid, or a phosphated monoglyceride. The diglyceride source for the product of an esterification of a diglyceride and glycerol can be a palm oil, a rapeseed oil, a soybean oil, a sunflower oil, a lard, a tallow, or a combination thereof. In various preferred embodiments, the emulsifying agent is a Dimodan® HS-KA, Dimodan® Visco-Lo, Dimodan® SO or sodium stearoyl lactylate, or a combination thereof.

Typically, the emulsifying agent is added to the food composition in an amount of 0.3 wt. % to about 1.5 wt. % based on the total weight of the composition; preferably, the emulsifying agent is added to the food composition in an amount of about 0.8 wt. % based on the total weight of the composition.

Electrolytes

In various embodiments, the protein formulations of the present disclosure further comprises electrolytes. Non limiting examples of electrolytes that can be present in the protein formulations disclosed here in include calcium, chloride, fluoride, iodine, magnesium, zinc, chromium, potassium, sodium, sulfate, hydrosulfate, carbonate, hydrocarbonate, and phosphates.

Minerals

In various embodiments, the protein formulations of the present disclosure further comprises one or more minerals. Non limiting examples of the minerals that may be present in the instantly disclosed protein formulations include calcium, chloride, chromium, copper, fluoride, iodine, iron, magnesium, manganese, molybdenum, phosphorus, potassium, selenium, sodium, sulfur, and zinc. In some embodiments, the mineral sources are may be present in nutritionally relevant amounts, which means that a serving of protein formulations provide a nourishing amount of said minerals. In some embodiments, this amount comprises at least about 1% of the U.S. RDA (Recommended Dietary Allowances) or RDI (Reference Daily Intake) for these minerals. In some embodiments, this amount comprises from about 1% of the U.S. RDA or RDI to about 100% of the U.S. RDA or RDI. In some embodiments, this amount comprises from about 10% to about 100% of the U.S. RDA or RDI, about 20% to about 100% of the U.S. RDA or RDI, about 30% to about 100% of the U.S. RDA or RDI, about 40% to about 100% of the U.S. RDA or RDI, about 50% to about 100% of the U.S. RDA or RDI, about 60% to about 100% of the U.S. RDA or RDI, about 70% to about 100% of the U.S. RDA or RDI, about 80% to about 100% of the U.S. RDA or RDI, about 90% to about 100% of the U.S. RDA or RDI, about 92% to about 100% of the U.S. RDA or RDI, about 94% to about 100% of the U.S. RDA or RDI, about 96% to about 100% of the U.S. RDA or RDI, about 98% to about 100% of the U.S. RDA or RDI, or about 99% to about 100% of the U.S. RDA or RDI. Of course, it is recognized that the preferred daily intake of any mineral may vary with the user, with greater than the U.S. RDA or RDI intakes being beneficial in some circumstances.

Flavoring Agents

In some embodiments, the protein formulation of the present disclosure further comprises one of more flavoring agents.

In various embodiments the protein formulations disclosed herein further comprise one or more sweeteners. The sweeteners suitable for the protein formulation disclosed herein include any edible sweetener suitable for use in food or beverage, or an ingredient of a food or beverage, for human or animal consumption.

Sweeteners suitable for use in various embodiments of the protein formulations disclosed here include nutritive and non-nutritive, natural, and artificial or synthetic sweeteners. Suitable sweetener is selected based on the desired nutritional characteristics, taste profile, mouthfeel, and other organoleptic factors. Non-nutritive artificial sweeteners suitable for the protein formulations include, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose.

Other non-nutritive sweeteners that can be used include, for example, sorbitol, mannitol. xylitol, glycyrrhizin, D-tagatose, erythritol, meso-erythritol, malitol, maltose, lactose, fructo-oligosaccharides, Lo Han Guo powder, steviol glycosides, e.g., rebaudiosides such as rebaudioside A, stevioside, etc., acesulfame, aspartame, other dipeptides, cyclamate, sucralose, saccharin, xylose, arabinose, isomalt, lactitol, maltitol, trehalose, and ribose, and protein sweeteners such as thaumatin, monellin, brazzein, L-alanine and glycine, related compounds, and mixtures of any of them.

In some embodiments, the protein formulations of the disclosure can include nutritive, natural crystalline or liquid sweeteners such as sucrose, liquid sucrose, fructose, liquid fructose, glucose, liquid glucose, glucose-fructose syrup from natural sources (such as apple, chicory, honey, etc.), high fructose corn syrup, invert sugar, maple syrup, maple sugar, honey, brown sugar molasses (e.g., cane molasses. Such as first molasses, second molasses, blackstrap molasses, and Sugar beet molasses), sorghum syrup, Lo Han Guo juice concentrate and/or others.

The total amount of sweeteners in the protein formulation will depend on several factors, for example upon the desired level of sweetness for the protein formulation. In some examples, the total amount of sweeteners present in the protein formulation is in the range of from about 0.1 wt % to about 20 wt % based on the total weight of the protein formulation. In some embodiments, the amount of sweetener in the protein formulation is at least about 0.1 wt %. In some embodiments, the amount of sweetener in the protein formulation is at most about 20 wt %. In some embodiments, the amount of sweetener in the protein formulation is about 0.1 wt % to about 1 wt %, about 0.1 wt % to about 2 wt %, about 0.1 wt % to about 4 wt %, about 0.1 wt % to about 6 wt %, about 0.1 wt % to about 8 wt %, about 0.1 wt % to about 10 wt %, about 0.1 wt % to about 12 wt %, about 0.1 wt % to about 14 wt %, about 0.1 wt % to about 16 wt %, about 0.1 wt % to about 18 wt %, about 0.1 wt % to about 20 wt %, about 1 wt % to about 2 wt %, about 1 wt % to about 4 wt %, about 1 wt % to about 6 wt %, about 1 wt % to about 8 wt %, about 1 wt % to about 10 wt %, about 1 wt % to about 12 wt %, about 1 wt % to about 14 wt %, about 1 wt % to about 16 wt %, about 1 wt % to about 18 wt %, about 1 wt % to about 20 wt %, about 2 wt % to about 4 wt %, about 2 wt % to about 6 wt %, about 2 wt % to about 8 wt %, about 2 wt % to about 10 wt %, about 2 wt % to about 12 wt %, about 2 wt % to about 14 wt %, about 2 wt % to about 16 wt %, about 2 wt % to about 18 wt %, about 2 wt % to about 20 wt %, about 4 wt % to about 6 wt %, about 4 wt % to about 8 wt %, about 4 wt % to about 10 wt %, about 4 wt % to about 12 wt %, about 4 wt % to about 14 wt %, about 4 wt % to about 16 wt %, about 4 wt % to about 18 wt %, about 4 wt % to about 20 wt %, about 6 wt % to about 8 wt %, about 6 wt % to about 10 wt %, about 6 wt % to about 12 wt %, about 6 wt % to about 14 wt %, about 6 wt % to about 16 wt %, about 6 wt % to about 18 wt %, about 6 wt % to about 20 wt %, about 8 wt % to about 10 wt %, about 8 wt % to about 12 wt %, about 8 wt % to about 14 wt %, about 8 wt % to about 16 wt %, about 8 wt % to about 18 wt %, about 8 wt % to about 20 wt %, about 10 wt % to about 12 wt %, about 10 wt % to about 14 wt %, about 10 wt % to about 16 wt %, about 10 wt % to about 18 wt %, about 10 wt % to about 20 wt %, about 12 wt % to about 14 wt %, about 12 wt % to about 16 wt %, about 12 wt % to about 18 wt %, about 12 wt % to about 20 wt %, about 14 wt % to about 16 wt %, about 14 wt % to about 18 wt %, about 14 wt % to about 20 wt %, about 16 wt % to about 18 wt %, about 16 wt % to about 20 wt %, or about 18 wt % to about 20 wt %. In some embodiments, the amount of sweetener in the protein formulation is from about 0.1 wt %, about 1 wt %, about 2 wt %, about 4 wt %, about 6 wt %, about 8 wt %, about 10 wt %, about 12 wt %, about 14 wt %, about 16 wt %, about 18 wt %, or about 20 wt %.

Stabilizing Agents

In various embodiments, the protein formulations disclosed herein further comprises one or more stabilizing agents. Non limiting examples of the stabilizing agents that can be used in the instant protein formulations include alginate, agar, carrageen, cellulose and cellulose derivatives, gelatin, guar gum, gum Arabic, locust bean gum, pectin, starch, xanthan gum, sterins, tocopherols, and ascorbyl palmitate. In some embodiments, the stabilizing agent is sterins, tocopherols, or ascorbyl palmitate.

Therapeutic Agents

The protein formulations of the present disclosure may additionally comprise a therapeutic agent. In some instances, the therapeutic agent may be a plant extract, for example comprises a *Cannabis* extract. The protein formulations described herein can include extracts derived from plant materials of any plant species belonging to the genus *Cannabis*. Non-limiting examples of suitable *Cannabis* species include *Cannabis sativa, Cannabis indica*, and *Cannabis ruderalis*. Hybrid *Cannabis* strains and inbred *Cannabis* strains are both suitable. Accordingly, in some embodiments, the protein formulations disclosed herein can include extracts from a hybrid *Cannabis* strain. In some embodiments, the protein formulations can include extracts from an inbred *Cannabis* strain. In some embodiments, protein formulations can include extracts from plant materials of one or more varieties of whole *Cannabis* plants, particularly *Cannabis sativa. Cannabis indica, Cannabis ruderalis*, or plants which are the result of genetic crosses, self-crosses or hybrids thereof. Non-limiting examples of suitable strains of *Cannabis* include, blueberry, white widow, charlotte's web, diesel, haze, BC bud, Holland's hope, kush, northern lights, purple, Jack Herer, Acapulco Gold and Malawi Gold (Chamba), Shaman, Sour, Skunk, and Te Puke Thunder. Further examples of suitable *Cannabis* strains include, but are not limited to Blackberry Kush, Blue Dream, Bubba Kush, Cherry Pie, Durban Poison, Fire OG, Girl Scout Cookies, Gorilla Glue, Grape Ape, Green Crack, Headband, Kosher Kush, Master Kush, OG Kush, Purple Haze, Purple Kush, Skywalker OG, Sour Diesel, Super Lemon Haze, Super Silver Haze, and White Widow. Additional non-limiting examples of *Cannabis* strains include strains that have been deposited under NCIMB Nos. 41541, 42254, 42255, 42256, 42257, and 42258. In some embodiments, the *Cannabis*-based formulations can include extracts from any physical part of the plant materials. Suitable plant materials include, but are not limited to, e.g., the leaf, bud, flower, trichome, seed, or a combination thereof.

The *Cannabis* plant material contains suitable and desirable compounds, including but not limited to cannabinoids, terpenes, terpenoids, and flavonoids. Accordingly, in some embodiments, the protein formulations can include one or more *Cannabis*-derived cannabinoid compounds. Cannabinoids can be in acid forms or in neutral forms (e.g., decarboxylated forms).

Typical cannabinoids isolated from *Cannabis* plants include, but are not limited to, tetrahydrocannabinol (THC), cannabidiol (CBD) and cannabinol (CBN). Other cannabinoids include for example, cannabichromene (CBC), cannabigerol (CBG) cannabinidiol (CBND), cannabicyclol (CBL), cannabivarin (CBV), tetrahydrocannabivarin (THCV), cannabidivarin (CBDV), cannabichromevarin (CBCV), cannabigerovarin (CBGV), cannabigerol monomethyl ether (CBGM). As used herein THC, CBD, CBN, CBC, CBG, CBND, CBL, CBV, THCV, CBDV, CBCV, CBGV and CBGM refer to the decarboxylated form of the cannabinoid. Whereas, THCA, CBD A, CBNA, CBC A, CBGA, CBND A, CBL A, CBVA, THCVA, CBDVA, CBCVA, CBGVA and CBGAM (cannabigerolic acid mononiethyl ether) refer to the corresponding acid form of the cannabinoid. In the *Cannabis* plant, cannabinoids are synthesized and accumulated as cannabinoid acids (e.g., cannabidiolic acid (CBDA)). When the herbal product is dried, stored, or heated, the acids are decarboxylated gradually or completely into neutral forms (e.g., THCA→THC and CBDA→CBD).

In some embodiments, the protein formulations described herein can include one, at least two, at least three, at least four, at least five, at least six, at least seven, at least eight, at least nine, at least ten, at least eleven, or at least twelve *Cannabis*-derived cannabinoid compounds. In some embodiments, the one or more *Cannabis*-derived cannabinoid compounds is selected from the group consisting of THC, CBD, CBN, CBC, CBG, CBND, CBL, CBV, THCV, CBDV, CBCV, CBGV, CBGM, THCA, CBDA, CBNA, CBC A, CBGA, CBND A, CBLA, CBVA, THCVA, CBDVA, CBCVA, CBGVA, CBGAM, and combinations of any thereof. In some embodiments, protein formulations can include THC (or THCA or an active analogue thereof). In some embodiments, the protein formulations can include CBD (or CBDA or an active analogue thereof). In some embodiments, the methods and compositions as described herein can exclude one or more of the *Cannabis*-derived cannabinoid compounds described above.

Additional Ingredients

Additional ingredients, as needed or desired, may be incorporated in the protein formulations disclosure. Such ingredients include bracers, flavanols, coloring agents, preservatives, acidulants, and/or food stability anti-oxidants.

If desired, coloring agents can also be added to the protein formulations of the present disclosure. Any soluble coloring agents approved for food use can be utilized for the present disclosure.

When desired preservatives, such as asorbic acid, benzoic acid, hexametaphosphate, and salts thereof can be added into the embodiments of the present disclosure.

Organic or inorganic edible acids may be used to adjust the pH of the protein formulations disclosed herein. Exemplary edible acids include citric acid, malic acid, fumaric acid, adipic acid, phosphoric acid, gluconic acid, tartaric acid, and ascorbic acid.

Products/Packaging

The protein formulations of the present disclosure are typically in the form of a paste, but other forms such as powder (flowable or substantially flowable particulate compositions, or at least particulate compositions that can be easily scooped and measured with a spoon or similar other device) and solutions are also contemplated. The protein formulations of the disclosure are generally ready-to-use, i.e. no reconstitution is required before consumption thereof. As used herein, the term "ready-to-eat" when used to describe a food, means that after manufacture and packaging, the food product requires no additional processing, including but not limited to cooking, baking, microwaving, boiling, frying; or combination with components outside of the product's packaging.

The protein formulations of the present disclosure may be packaged and sealed in single or multi-use containers. For multi-use containers, these packages can be opened and then covered for repeated use by the ultimate user. In some embodiments, the protein formulations disclosed herein may be packaged in a squeezable pouch, tube, or packet using conventional packaging techniques. The protein formulations may be squeezed from the pouch, tube, or packet to deliver the protein formulation directly into an individual's mouth.

In some embodiments, a single serving of the protein formulations is about 10 gram (g) to about 300 g. In some embodiments, a single serving of the protein formulations is at least about 10 g. In some embodiments, a single serving of the protein formulations is at most about 300 g. In some embodiments, a single serving of the protein formulations is about 10 g to about 20 g, about 10 g to about 30 g, about 10 g to about 40 g, about 10 g to about 50 g, about 10 g to about 60 g, about 10 g to about 70 g, about 10 g to about 80 g, about 10 g to about 90 g, about 10 g to about 100 g, about 10 g to about 200 g, about 10 g to about 300 g, about 20 g to about 30 g, about 20 g to about 40 g, about 20 g to about 50 g, about 20 g to about 60 g, about 20 g to about 70 g, about 20 g to about 80 g, about 20 g to about 90 g, about 20 g to about 100 g, about 20 g to about 200 g, about 20 g to about 300 g, about 30 g to about 40 g, about 30 g to about 50 g, about 30 g to about 60 g, about 30 g to about 70 g, about 30 g to about 80 g, about 30 g to about 90 g, about 30 g to about 100 g, about 30 g to about 200 g, about 30 g to about 300 g, about 40 g to about 50 g, about 40 g to about 60 g, about 40 g to about 70 g, about 40 g to about 80 g, about 40 g to about 90 g, about 40 g to about 100 g, about 40 g to about 200 g, about 40 g to about 300 g, about 50 g to about 60 g, about 50 g to about 70 g, about 50 g to about 80 g, about 50 g to about 90 g, about 50 g to about 100 g, about 50 g to about 200 g, about 50 g to about 300 g, about 60 g to about 70 g, about 60 g to about 80 g, about 60 g to about 90 g, about 60 g to about 100 g, about 60 g to about 200 g, about 60 g to about 300 g, about 70 g to about 80 g, about 70 g to about 90 g, about 70 g to about 100 g, about 70 g to about 200 g, about 70 g to about 300 g, about 80 g to about 90 g, about 80 g to about 100 g, about 80 g to about 200 g, about 80 g to about 300 g, about 90 g to about 100 g, about 90 g to about 200 g, about 90 g to about 300 g, about 100 g to about 200 g, about 100 g to about 300 g, or about 200 g to about 300 g. In some embodiments, a single serving of the protein formulations is about 10 g, about 20 g, about 30 g, about 40 g, about 50 g, about 60 g, about 70 g, about 80 g, about 90 g, about 100 g, about 200 g, or about 300 g. In some embodiments, a single serving of the protein formulations is about 50 g.

The protein formulations of the present disclosure may have any caloric density suitable for the targeted or intended patient population. In some embodiments, a single serving of the protein formulations comprises about 150 calories to about 450 calories. In some embodiments, a single serving of the protein formulations comprises at least about 150 calories. In some embodiments, a single serving of the protein formulations comprises at most about 450 calories. In some embodiments, a single serving of the protein formulations comprises about 150 calories to about 200 calories, about 150 calories to about 250 calories, about 150 calories to about 300 calories, about 150 calories to about 350 calories, about 150 calories to about 400 calories, about 150 calories to about 450 calories, about 200 calories to about 250 calories, about 200 calories to about 300 calories, about 200 calories to about 350 calories, about 200 calories to about 400 calories, about 200 calories to about 450 calories, about 250 calories to about 300 calories, about 250 calories to about 350 calories, about 250 calories to about 400 calories, about 250 calories to about 450 calories, about 300 calories to about 350 calories, about 300 calories to about 400 calories, about 300 calories to about 450 calories, about 350 calories to about 400 calories, about 350 calories to about 450 calories, or about 400 calories to about 450 calories. In some embodiments, a single serving of the protein formulations comprises about 150 calories, about 200 calories, about 250 calories, about 300 calories, about 350 calories, about 400 calories, or about 450 calories. In some embodiments, a single serving of the protein formulations comprises about 215 calories. In some embodiments, a single serving of the protein formulations comprises about 300 calories.

Applications

Slow Digestive Release Protein Formulations

In some embodiments, the protein formulations of the present disclosure have a slow digestive release. The slow-digesting protein formulations are capable of improving or preventing problems linked with various physiological or physiopathological states. Indeed, the protein materials with a slow rate of digestion can act by optimizing the postprandial protein gain, by avoiding excessive functioning for key organs or for certain enzymes, by optimizing treatments with L-DOPA, and by increasing the sensation of satiety. The conditions governing the use of these proteins will depend in particular on the categories of people concerned.

In the context of the optimization of the postprandial protein gain, cases of undernourishment may be treated. Undernourishment frequently exists in elderly individuals or during diseases which comprise a substantial loss of body proteins—renal insufficiency, severe burns, trauma, surgical or infectious stress, inflammation, cancer or AIDS. This metabolic state manifests itself by a negative nitrogen balance which is the consequence of a fusion of the body, and more particularly muscle, proteins. Indeed, the muscle proteins are degraded so as to provide energy to the body and allow the redistribution of the amino acids to the synthesis of specific proteins. In cases of undernourishment, the ingestion of slow-digesting protein formulation is capable of limiting this protein loss, by optimizing the postprandial protein gain. These protein formulations ought to increase the rate of physiological recovery, resistance to attacks, the quality of life and therefore the vital prognosis.

Renal abnormality, in the broad sense of the term, is an example of the use of the slow-digesting protein formulation which is not solely based on the optimization of the postprandial protein gain, although it is an essential component thereof. Indeed, during renal abnormalities, patients are subjected to a strict hypoprotein diet so as to reduce the production of nitrogenous waste. It is commonly accepted that such a diet has a favorable effect on the general condition, the quality of life and even on the renal function. However, this diet is very poorly tolerated by patients. The ingestion of slow-digesting protein formulation contributes toward: (1) reducing the production of nitrogen which should be subsequently eliminated by the kidneys; (2) distributing this production over a much longer period; and (3) increasing the satiating action of this type of protein in order to ensure better tolerance of the diet. Proteins with a slow rate of digestion are consequently particularly suitable for the nutrition of patients with renal disorders.

Likewise, the slow-digesting protein formulation may be prescribed for patients with pathological hepatic conditions. After a meal composed of various nitrogenous compounds (proteins, peptides, amino acids), the liver will try to maintain the amino acid concentration within physiological limits by breaking down a portion of the amino acids derived from the diet. A moderate arrival of dietary amino acids is capable of reducing the excessive activity of an organ which exhibits pathological conditions and which will consequently make it possible to avoid excessive work. In addition, the slow-digesting protein formulation induces a better postprandial protein gain. During a deficiency in proteolytic pancreatic enzymes, the ingestion of slow-digesting protein formulation can contribute toward improving the digestion process. This benefit is brought about by the reduction in the quantity of substrate to be hydrolyzed by the proteolytic enzymes of the pancreas and therefore by the obtaining of a better enzyme/substrate ratio. Furthermore, with the slow-digesting protein material, there is a better postprandial protein gain.

The use of slow-digesting protein formulation can also be envisaged for people who are not undernourished, such as premature babies, newborns, children, obese individuals and elderly persons, for example. The ingestion of slow-digesting protein material, in premature babies, newborns or children who are not undernourished, by providing a better yield of use of the dietary proteins, is capable of promoting body growth.

The slow-digesting protein material, by reducing the food intake by a satiating mechanism, may be administered to people with disorders of weight homeostasis (obesity) or during episodes of bulimia. It can limit the reduction in the protein mass subsequent to being on a low-caloric diet. These two combined factors make it possible to reduce their fatty mass with, on the one hand, greater ease for reducing their supplies and, on the other hand, a better preservation of their protein mass. In elderly individuals, compared with young individuals, there is a reduction in the body protein mass, a reduction which has an influence on the autonomy, the resistance to attacks (diseases, various stresses) and the ability to recover from these attacks. Furthermore, aging is associated with a reduction in renal activity. The slow-digesting protein material, by therefore allowing better preservation of the protein mass, thus makes it possible to avoid renal excesses. The protein formulation with a slowed rate of digestion, by providing the amino acids in a more continuous and regular manner, makes it possible to promote the synthesis of novel tissue materials which are involved in the processes of wound healing or of regeneration of biological tissues.

Therapeutic Ready-to-Use Therapeutic Food

In some embodiments, the protein formulations of the disclosure are therapeutic food, useful in feeding patient. In some embodiments, the protein formulations described herein are used to feed patients with chronic conditions. In some embodiments, the protein formulations described herein are used to feed patient recovering from surgery. In some embodiments, the protein formulations described herein are used to feed patients undergoing a therapy, patients who will undergo a therapy, or patients who are recovering from a therapy, for example chemotherapy. In some embodiments the protein formulations described herein are used to treat patients who suffer from a reduced appetite due to a disease, treatment or a therapy. In some embodiments the protein formulations described herein are used to treat patients who suffer from nausea. In some embodiments, the protein formulations described herein are energy-dense and/or micronutrient-enriched and as such provide superior nutrition to patients, as compared to foods made with conventional proteins.

In some embodiments, the protein formulations useful as therapeutic food are high density protein formulations, which provide high protein availability and slow release carbohydrate source. The therapeutic foods described herein provide slow-release of carbohydrates and/or proteins. In some embodiments, the protein formulations disclosed herein are fat-mediated formulation, which enables digestive release of the nutrients (e.g. protein and/or the carbohydrates).

In some examples, the protein formulations useful as therapeutic food have balanced electrolyte content and provide a low osmolality load. These properties are beneficial in preventing osmolar shock for patients suffering from dehydration, or for patients who are otherwise hydration compromised. These properties are also particularly useful for feeding patients sensitive to nausea, for example with nausea due to a medical condition and/or a therapy.

In some embodiments, the therapeutic food disclosed herein have zero or near zero sugar content and can be used for feeding insulin-sensitive patients and/or glycemic sensitive patients.

In some examples, the protein formulations useful as therapeutic food comprise protein, fat and carbohydrates. In some examples, the amount of protein in the protein formulations useful as therapeutic food is from about 20 wt % to about 75 wt %. In some examples, the amount of protein in the protein formulations useful as therapeutic food is from at least about 20 wt %. In some examples, the amount of protein in the protein formulations useful as therapeutic food is from at most about 75 wt %. In some examples, the amount of protein in the protein formulations useful as therapeutic food is from about 20 wt % to about 25 wt %, about 20 wt % to about 30 wt %, about 20 wt % to about 35 wt %, about 20 wt % to about 40 wt %, about 20 wt % to about 45 wt %, about 20 wt % to about 50 wt %, about 20 wt % to about 55 wt %, about 20 wt % to about 60 wt %, about 20 wt % to about 65 wt %, about 20 wt % to about 70 wt %, about 20 wt % to about 75 wt %, about 25 wt % to about 30 wt %, about 25 wt % to about 35 wt %, about 25 wt % to about 40 wt %, about 25 wt % to about 45 wt %, about 25 wt % to about 50 wt %, about 25 wt % to about 55 wt %, about 25 wt % to about 60 wt %, about 25 wt % to about 65 wt %, about 25 wt % to about 70 wt %, about 25 wt % to about 75 wt %, about 30 wt % to about 35 wt %, about 30 wt % to about 40 wt %, about 30 wt % to about 45 wt %, about 30 wt % to about 50 wt %, about 30 wt % to about 55 wt %, about 30 wt % to about 60 wt %, about 30 wt % to about 65 wt %, about 30 wt % to about 70 wt %, about 30 wt % to about 75 wt %, about 35 wt % to about 40 wt %, about 35 wt % to about 45 wt %, about 35 wt % to about 50 wt %, about 35 wt % to about 55 wt %, about 35 wt % to about 60 wt %, about 35 wt % to about 65 wt %, about 35 wt % to about 70 wt %, about 35 wt % to about 75 wt %, about 40 wt % to about 45 wt %, about 40 wt % to about 50 wt %, about 40 wt % to about 55 wt %, about 40 wt % to about 60 wt %, about 40 wt % to about 65 wt %, about 40 wt % to about 70 wt %, about 40 wt % to about 75 wt %, about 45 wt % to about 50 wt %, about 45 wt % to about 55 wt %, about 45 wt % to about 60 wt %, about 45 wt % to about 65 wt %, about 45 wt % to about 70 wt %, about 45 wt % to about 75 wt %, about 50 wt % to about 55 wt %, about 50 wt % to about 60 wt %, about 50 wt % to about 65 wt %, about 50 wt % to about 70 wt %, about 50 wt % to about 75 wt %, about 55 wt % to about 60 wt %, about 55 wt % to about 65 wt %, about 55 wt % to about 70 wt %, about 55 wt % to about 75 wt %, about 60 wt % to about 65 wt %, about 60 wt % to about 70 wt %, about 60 wt % to about 75 wt %, about 65 wt % to about 70 wt %, about 65 wt % to about 75 wt %, or about 70 wt % to about 75 wt %. In some examples, the amount of protein in the protein formulations useful as therapeutic food is from about 20 wt %, about 25 wt %, about 30 wt %, about 35 wt %, about 40 wt %, about 45 wt %, about 50 wt %, about 55 wt %, about 60 wt %, about 65 wt %, about 70 wt %, or about 75 wt %. In some examples, the amount of protein in the protein formulations useful as therapeutic food is from about 40 wt % to about 50 wt %. In some examples, the amount of protein in the protein formulations useful as therapeutic food is from about 40 wt % to about 45 wt %. In some examples, the amount of protein in the protein formulations useful as therapeutic food is about 42 wt %.

In some examples, the amount of fat in the protein formulations useful as therapeutic food is from about 5 wt % to about 30 wt %. In some examples, the amount of fat in the protein formulations useful as therapeutic food is from at least about 5 wt %. In some examples, the amount of fat in the protein formulations useful as therapeutic food is from at most about 30 wt %. In some examples, the amount of fat in the protein formulations useful as therapeutic food is from about 5 wt % to about 10 wt %, about 5 wt % to about 15 wt %, about 5 wt % to about 20 wt %, about 5 wt % to about 25 wt %, about 5 wt % to about 30 wt %, about 10 wt % to about 15 wt %, about 10 wt % to about 20 wt %, about 10 wt % to about 25 wt %, about 10 wt % to about 30 wt %, about 15 wt % to about 20 wt %, about 15 wt % to about 25 wt %, about 15 wt % to about 30 wt %, about 20 wt % to about 25 wt %, about 20 wt % to about 30 wt %, or about 25 wt % to about 30 wt %. In some examples, the amount of fat in the protein formulations useful as therapeutic food is from about 5 wt %, about 10 wt %, about 15 wt %, about 20 wt %, about 25 wt %, or about 30 wt %. In some examples, the amount of fat in the protein formulations useful as therapeutic food is from about 10 wt % to about 20 wt % of fat. In some examples, the amount of fat in the protein formulations useful as therapeutic food is from about 14 wt % to about 18 wt %. In some examples, the amount of fat in the protein formulations useful as therapeutic food is about 16 wt %.

In some examples, the amount of carbohydrates in the protein formulations useful as therapeutic food is from about 10 wt % to about 65 wt %. In some examples, the amount of carbohydrates in the protein formulations useful as therapeutic food is from at least about 10 wt %. In some examples, the amount of carbohydrates in the protein formulations useful as therapeutic food is from at most about 65 wt %. In some examples, the amount of carbohydrates in the protein formulations useful as therapeutic food is from about 10 wt % to about 15 wt %, about 10 wt % to about 20 wt %, about 10 wt % to about 25 wt %, about 10 wt % to about 30 wt %, about 10 wt % to about 35 wt %, about 10 wt % to about 40 wt %, about 10 wt % to about 45 wt %, about 10 wt % to about 50 wt %, about 10 wt % to about 55 wt %, about 10 wt % to about 60 wt %, about 10 wt % to about 65 wt %, about 15 wt % to about 20 wt %, about 15 wt % to about 25 wt %, about 15 wt % to about 30 wt %, about 15 wt % to about 35 wt %, about 15 wt % to about 40 wt %, about 15 wt % to about 45 wt %, about 15 wt % to about 50 wt %, about 15 wt % to about 55 wt %, about 15 wt % to about 60 wt %, about 15 wt % to about 65 wt %, about 20 wt % to about 25 wt %, about 20 wt % to about 30 wt %, about 20 wt % to about 35 wt %, about 20 wt % to about 40 wt %, about 20 wt % to about 45 wt %, about 20 wt % to about 50 wt %, about 20 wt % to about 55 wt %, about 20 wt % to about 60 wt %, about 20 wt % to about 65 wt %, about 25 wt % to about 30 wt %, about 25 wt % to about 35 wt %, about 25 wt % to about 40 wt %, about 25 wt % to about 45 wt %, about 25 wt % to about 50 wt %, about 25 wt % to about 55 wt %, about 25 wt % to about 60 wt %, about 25 wt % to about 65 wt %, about 30 wt % to about 35 wt %, about 30 wt % to about 40 wt %, about 30 wt % to about 45 wt %, about 30 wt % to about 50 wt %, about 30 wt % to about 55 wt %, about 30 wt % to about 60 wt %, about 30 wt % to about 65 wt %, about 35 wt % to about 40 wt %, about 35 wt % to about 45 wt %, about 35 wt % to about 50 wt %, about 35 wt % to about 55 wt %, about 35 wt % to about 60 wt %, about 35 wt % to about 65 wt %, about 40 wt % to about 45 wt %, about 40 wt % to about 50 wt %, about 40 wt % to about 55 wt %, about 40 wt % to about 60 wt %, about 40 wt % to about 65 wt %, about 45 wt % to about 50 wt %, about 45 wt % to about 55 wt %, about 45 wt % to about 60 wt %, about 45 wt % to about 65 wt %, about 50 wt % to about 55 wt %, about 50 wt % to about 60 wt %, about 50 wt % to about 65 wt %, about 55 wt % to about 60 wt %, about 55 wt % to about 65 wt %, or about 60 wt % to about 65 wt %. In some examples, the amount of carbohydrates in the protein formulations useful as therapeutic food is from about 10 wt %, about 15 wt %, about 20 wt %, about 25 wt %, about 30 wt %, about 35 wt %, about 40 wt %, about 45 wt %, about 50 wt %, about 55 wt %, about 60 wt %, or about 65 wt %. In some examples, the amount of carbohydrates in the protein formulations useful as therapeutic food is from about 25 wt % to about 35 wt %, for example about 27 wt % to about 32 wt %. In some examples, the amount of carbohydrates in the protein formulations useful as therapeutic food is about 30 wt %.

The protein formulations useful as therapeutic food may further comprise one or more additional components disclosed herein. For example, the protein formulations useful as therapeutic food further comprise one more vitamins, minerals, electrolytes, flavoring agents, stabilizing agents, sweeteners, and emulsifiers disclosed herein. In some embodiments, the protein formulations useful as therapeutic food are sweetened using plant-based non-nutritive sweetener. In some embodiments, the protein formulations useful as therapeutic food are flavored to suit needs of the target patient population. In some embodiments, the protein formulations useful as therapeutic food comprise a stabilizing agent. Any suitable stabilizing agent can be used, including those described in this disclosure. In some embodiments, the protein formulations useful as therapeutic food are stabilized with sterins, tocopherols and/or ascorbyl palmitate.

In some embodiments, the protein formulations useful as therapeutic food are supplemented with *Cannabis* extract, for example to feed patients needing anti-emetic or pain management therapies.

In some embodiments, the total amount of the vitamins, minerals, electrolytes, flavoring agents, stabilizing agents, sweeteners, and/or emulsifiers in the protein formulations useful as therapeutic food is about 5% to about 25%, for example about 5%-about 20%, about 5% to about 15%, about 5% to about 10%, about 10% to about 25%, about 10% to about 20%, about 10% to about 15%, about 15% to about 25%, about 15% to about 20%, about 200% to about 25%. In some embodiments, the total amount of the vitamins, minerals, electrolytes, flavoring agents, stabilizing agents, sweeteners, and/or emulsifiers in the protein formulations useful as therapeutic food is about 10% to about 15%, for example about 12%.

Ketogenic Diets and Fast-Mimicking Diets

In some embodiments, the protein formulations of the invention are useful as ketogenic and/or fast mimicking diet formula. Fast-mimicking diets and ketogenic diets have emerged as very efficient strategies for weight loss and diabetes prevention and management. These diets are very low in carbohydrates and sugar and high in fat and proteins. Research indicates that it is very difficult to adhere to such diets because of the unavailability of foods with the adequate composition and potentially cumbersome preparation. The protein formulations of the disclosure provide composition for such diets.

In some examples, the protein formulations useful as ketogenic and/or fast mimicking diet comprise protein, fat and carbohydrates. In some examples, the amount of protein in the protein formulations useful as ketogenic and/or fast mimicking diet is from about 20 wt % to about 75 wt %. In some examples, the amount of protein in the protein formulations useful as ketogenic and/or fast mimicking diet is from at least about 20 wt %. In some examples, the amount of protein in the protein formulations useful as ketogenic and/or fast mimicking diet is from at most about 75 wt %. In some examples, the amount of protein in the protein formulations useful as ketogenic and/or fast mimicking diet is from about 20 wt % to about 25 wt %, about 20 wt % to about 30 wt %, about 20 wt % to about 35 wt %, about 20 wt % to about 40 wt %, about 20 wt % to about 45 wt %, about 20 wt % to about 50 wt %, about 20 wt % to about 55 wt %, about 20 wt % to about 60 wt %, about 20 wt % to about 65 wt %, about 20 wt % to about 70 wt %, about 20 wt % to about 75 wt %, about 25 wt % to about 30 wt %, about 25 wt % to about 35 wt %, about 25 wt % to about 40 wt %, about 25 wt % to about 45 wt %, about 25 wt % to about 50 wt %, about 25 wt % to about 55 wt %, about 25 wt % to about 60 wt %, about 25 wt % to about 65 wt %, about 25 wt % to about 70 wt %, about 25 wt % to about 75 wt %, about 30 wt % to about 35 wt %, about 30 wt % to about 40 wt %, about 30 wt % to about 45 wt %, about 30 wt % to about 50 wt %, about 30 wt % to about 55 wt %, about 30 wt % to about 60 wt %, about 30 wt % to about 65 wt %, about 30 wt % to about 70 wt %, about 30 wt % to about 75 wt %, about 35 wt % to about 40 wt %, about 35 wt % to about 45 wt %, about 35 wt % to about 50 wt %, about 35 wt % to about 55 wt %, about 35 wt % to about 60 wt %, about 35 wt % to about 65 wt %, about 35 wt % to about 70 wt %, about 35 wt % to about 75 wt %, about 40 wt % to about 45 wt %, about 40 wt % to about 50 wt %, about 40 wt % to about 55 wt %, about 40 wt % to about 60 wt %, about 40 wt % to about 65 wt %, about 40 wt % to about 70 wt %, about 40 wt % to about 75 wt %, about 45 wt % to about 50 wt %, about 45 wt % to about 55 wt %, about 45 wt % to about 60 wt %, about 45 wt % to about 65 wt %, about 45 wt % to about 70 wt %, about 45 wt % to about 75 wt %, about 50 wt % to about 55 wt %, about 50 wt % to about 60 wt %, about 50 wt % to about 65 wt %, about 50 wt % to about 70 wt %, about 50 wt % to about 75 wt %, about 55 wt % to about 60 wt %, about 55 wt % to about 65 wt %, about 55 wt % to about 70 wt %, about 55 wt % to about 75 wt %, about 60 wt % to about 65 wt %, about 60 wt % to about 70 wt %, about 60 wt % to about 75 wt %, about 65 wt % to about 70 wt %, about 65 wt % to about 75 wt %, or about 70 wt % to about 75 wt %. In some examples, the amount of protein in the protein formulations useful as ketogenic and/or fast mimicking diet is from about 20 wt %, about 25 wt %, about 30 wt %, about 35 wt %, about 40 wt %, about 45 wt %, about 50 wt %, about 55 wt %, about 60 wt %, about 65 wt %, about 70 wt %, or about 75 wt %. In some examples, the amount of protein in the protein formulations useful as ketogenic and/or fast mimicking diet is from about 20 wt % to about 40 wt %. In some examples, the amount of protein in the protein formulations useful as ketogenic and/or fast mimicking diet is from about 25 wt % to about 35 wt %. In some examples, the amount of protein in the protein formulations useful as ketogenic and/or fast mimicking diet is about 30 wt %.

In some examples, the amount of fat in the protein formulations useful as ketogenic and/or fast mimicking diets is from about 20 wt % to about 40 wt %. In some examples, the amount of fat in the protein formulations useful as ketogenic and/or fast mimicking diets is from at least about 20 wt %. In some examples, the amount of fat in the protein formulations useful as ketogenic and/or fast mimicking diets is from at most about 40 wt %. In some examples, the amount of fat in the protein formulations useful as ketogenic and/or fast mimicking diets is from about 20 wt % to about 25 wt %, about 20 wt % to about 30 wt %, about 20 wt % to about 35 wt %, about 20 wt % to about 40 wt %, about 25 wt % to about 30 wt %, about 25 wt % to about 35 wt %, about 25 wt % to about 40 wt %, about 30 wt % to about 35 wt %, about 30 wt % to about 40 wt %, or about 35 wt % to about 40 wt %. In some examples, the amount of fat in the protein formulations useful as ketogenic and/or fast mimicking diets is from about 20 wt %, about 25 wt %, about 30 wt %, about 35 wt %, or about 40 wt %. In some examples, the amount of fat in the protein formulations useful as ketogenic and/or fast mimicking diets is from about 25 wt % to about 35 wt %. In some examples, the amount of fat in the protein formulations useful as ketogenic and/or fast mimicking diets is about 30 wt %.

In some examples, the amount of carbohydrates in the protein formulations useful as ketogenic and/or fast mimicking diets is from about 10 wt % to about 65 wt %. In some examples, the amount of carbohydrates in the protein formulations useful as ketogenic and/or fast mimicking diets is from at least about 10 wt %. In some examples, the amount of carbohydrates in the protein formulations useful as ketogenic and/or fast mimicking diets is from at most about 65 wt %. In some examples, the amount of carbohydrates in the protein formulations useful as ketogenic and/or fast mimicking diets is from about 10 wt % to about 15 wt %, about 10 wt % to about 20 wt %, about 10 wt % to about 25 wt %, about 10 wt % to about 30 wt %, about 10 wt % to about 35 wt %, about 10 wt % to about 40 wt %, about 10 wt % to about 45 wt %, about 10 wt % to about 50 wt %, about 10 wt % to about 55 wt %, about 10 wt % to about 60 wt %, about 10 wt % to about 65 wt %, about 15 wt % to about 20 wt %, about 15 wt % to about 25 wt %, about 15 wt % to about 30 wt %, about 15 wt % to about 35 wt %, about 15 wt % to about 40 wt %, about 15 wt % to about 45 wt %, about 15 wt % to about 50 wt %, about 15 wt % to about 55 wt %, about 15 wt % to about 60 wt %, about 15 wt % to about 65 wt %, about 20 wt % to about 25 wt %, about 20 wt % to about 30 wt %, about 20 wt % to about 35 wt %, about 20 wt % to about 40 wt %, about 20 wt % to about 45 wt %, about 20 wt % to about 50 wt %, about 20 wt % to about 55 wt %, about 20 wt % to about 60 wt %, about 20 wt % to about 65 wt %, about 25 wt % to about 30 wt %, about 25 wt % to about 35 wt %, about 25 wt % to about 40 wt %, about 25 wt % to about 45 wt %, about 25 wt % to about 50 wt %, about 25 wt % to about 55 wt %, about 25 wt % to about 60 wt %, about 25 wt % to about 65 wt %, about 30 wt % to about 35 wt %, about 30 wt % to about 40 wt %, about 30 wt % to about 45 wt %, about 30 wt % to about 50 wt %, about 30 wt % to about 55 wt %, about 30 wt % to about 60 wt %, about 30 wt % to about 65 wt %, about 35 wt % to about 40 wt %, about 35 wt % to about 45 wt %, about 35 wt % to about 50 wt %, about 35 wt % to about 55 wt %, about 35 wt % to about 60 wt %, about 35 wt % to about 65 wt %, about 40 wt % to about 45 wt %, about 40 wt % to about 50 wt %, about 40 wt % to about 55 wt %, about 40 wt % to about 60 wt %, about 40 wt % to about 65 wt %, about 45 wt % to about 50 wt %, about 45 wt % to about 55 wt %, about 45 wt % to about 60 wt %, about 45 wt % to about 65 wt %, about 50 wt % to about 55 wt %, about 50 wt % to about 60 wt %, about 50 wt % to about 65 wt %, about 55 wt % to about 60 wt %, about 55 wt % to about 65 wt %, or about 60 wt % to about 65 wt %. In some examples, the amount of carbohydrates in the protein formulations useful as ketogenic and/or fast mimicking diets is from about 10 wt %, about 15 wt %, about 20 wt %, about 25 wt %, about 30 wt %, about 35 wt %, about 40 wt %, about 45 wt %, about 50 wt %, about 55 wt %, about 60 wt %, or about 65 wt %. In some examples, the amount of carbohydrates in the protein formulations useful as ketogenic and/or fast mimicking diets is from about 25 wt % to about 35 wt %, for example about 27 wt % to about 32 wt %. In some examples, the amount of carbohydrates in the protein formulations useful as ketogenic and/or fast mimicking diets is about 30 wt %.

The protein formulations useful as ketogenic and/or fast mimicking diets may further comprise one or more additional components disclosed herein. For example, the protein formulations useful as ketogenic and/or fast mimicking diets further comprise one more vitamins, minerals, electrolytes, flavoring agents, stabilizing agents, sweeteners, and emulsifiers disclosed herein. In some embodiments, the protein formulations useful as ketogenic and/or fast mimicking diets are sweetened using plant-based non-nutritive sweetener. In some embodiments, the protein formulations useful as ketogenic and/or fast mimicking diets are flavored to suit needs of the target patient population. In some embodiments, the protein formulations useful as ketogenic and/or fast mimicking diets comprise a stabilizing agent. Any suitable stabilizing agent can be used, including those described in this disclosure. In some embodiments, the protein formulations useful as ketogenic and/or fast mimicking diets are stabilized with sterins, tocopherols and/or ascorbyl palmitate.

In some embodiments, the protein formulations useful as ketogenic and/or fast mimicking diets are supplemented with *Cannabis* extract, for example to feed patients needing anti-emetic or pain management therapies.

In some embodiments, the total amount of the vitamins, minerals, electrolytes, flavoring agents, stabilizing agents, sweeteners, and/or emulsifiers in the protein formulations useful as therapeutic food is about 5% to about 25%, for example about 5%-about 20%, about 5% to about 15%, about 5% to about 10%, about 10% to about 25%, about 10% to about 20%, about 10% to about 15%, about 15% to about 25%, about 15% to about 20%, about 200% to about 25%. In some embodiments, the total amount of the vitamins, minerals, electrolytes, flavoring agents, stabilizing agents, sweeteners, and/or emulsifiers in the protein formulations useful as ketogenic and/or fast mimicking diets is about 8% to about 12%, for example about 10%.

In some embodiments, the protein formulation useful as ketogenic and/or fast mimicking diets are used in feeding patients suffering from epilepsy, obesity, diabetes, high cholesterol, cancers, inflammatory diseases, trauma, behavioral disorders, senile dementia, autism, cerebral spinal cord injury, migraine, neurodegenerative and degenerative diseases. In some embodiments, the ketogenic and/or fast mimicking diets are useful in treating or controlling epilepsy, obesity, diabetes, high cholesterol, cancers, inflammatory diseases, trauma, behavioral disorders, senile dementia, migraine, neurodegenerative and degenerative diseases. In some embodiments, the protein formulation useful as ketogenic and/or fast mimicking diets is used in feeding patients suffering from obesity. In some embodiments, the ketogenic and/or fast mimicking diets are useful in treating or controlling obesity. In some embodiments, the ketogenic and/or fast mimicking diets are useful in feeding patients in need of, or wanting weight, loos.

Ready-to-Use Therapeutic Foods (RUTFs) and Ready-to-Use Supplemental Food (RF)

In some embodiments, the protein formulations provided herein are useful as Ready-to-use-therapeutic food (RUTF). In various embodiments, the RUTFs provided herein differ from conventional RUTF, in that they do not comprise any milk protein. For example the RUTFs provided herein do not comprise any non-fat dried milk (NFDM), whey protein concentrate (WPC) or milk protein concentrate (MPC), which tend to be increasingly expensive. In these embodiments, the RUTFs comprise an alternative source of animal-based protein. In some examples this alternate protein is protein from an aquatic animal, for example fish protein. These RUTFs comprise no, or essentially no lactose. In various embodiments these RUTFs maintain an ideal amino acid profile (PDCAAS score). In various embodiments, the RUTFs provided herein have a nutritional profile similar to a traditional F-75 or F-100 milk-based diet.

In some embodiments, the protein formulations provided herein are useful as Ready-to-use-supplemental food (RUSF). In various embodiments, the RUSFs provided herein differ from the conventional RUSFs in that they do not comprise any dairy protein. As such the RUSFs provided herein comprise no or essentially no lactose. In some embodiments, the RUSFs disclosed herein provide no plant-based protein. For example, the RUSF of the disclosure comprise no pea or soy protein. In some embodiments, the RUSFs disclosed herein provide no plant-based protein and no milk based protein. In these examples, the RUSFs described herein comprise an alternate protein instead of the milk and/or plant based-protein. In some examples, the alternate protein is protein from an aquatic animal, for example fish protein.

In various examples, the RUSFs and RUTFs of the disclosure provide improved palatability and/or good dispersibility as compared to the traditional RUSFs and RUTFs. In some embodiments, the RUSFs and RUTFs described herein comprise protein powder that is sourced from "green" zero carbon footprint and low water consumption sourcing and are therefore preferred compared to the traditional RUSFs and RUTFs.

Typically the RUTFs and RUSFs disclosed herein will follow similar required nutrient formulations as mandated by the GMOs. However in various embodiments, the RUTFs and the RUSFs disclosed herein are formulated from protein powder with high protein content (e.g. >90%, >91%, >92%, >93%, >94%, >95%, >96%, >97%, >98%, or >99% protein) and low carbohydrate content (e.g. <10%, <9%, <8%, <7%, <5%, <4%, <3%, <2%, <1%, <0.5%, <0.25%, or <0.1%). This high quality of the protein powder provides some added flexibility in formulation of these RUSFs and RUTFs, when compared to use of NFDM, MPC, WPC, soy protein isolate (SPI) and pea protein concentrate.

EXAMPLES

The following specific examples are illustrative and non-limiting. The examples described herein reference and provide non-limiting support to the various embodiments described in the preceding sections.

Example 1. Composition of an Exemplary Ready to Use Therapeutic Food

Serving size: 50 g serving size;
Packaging: Paste in a squeezable pouch
Calorie content: 215 calories
  Protein: 21 g of fish protein powder (Example 4)
  Fat: 8 g total fat including omega-3 rich fish oil
  Carbohydrates: 15 g complex carbohydrates, including fiber, from Barley
  Vitamins, electrolytes, minerals, flavorings and stabilizing agents: 6 g Example 2. Exemplary Ketogenic Diets and Fast-Mimicking Formula Serving size: 50 g
Packaging: Paste in a squeezable pouch
Calorie content: 300 calories
  Protein: 15 g of fish protein powder (Example 4)
  Fat: 15 g total fat including omega-3 rich fish oil
  Carbohydrates: 15 g low GI carbohydrate source
  Vitamins, electrolytes, minerals, flavorings and stabilizing agents: 10 g Example 3. Exemplary Method of Making the Formulation A carrier oil (for example vegetable oil comprising canola oil, safflower oil, soya oil, or any combination thereof) is heated to 70° C. and stabilizers and emulsifiers (for example, mono glycerides, palm oil stearin, ascorbyl palmitate, or any combination thereof) are blended to melt. To this mixture vitamins and/or minerals are added and blend well. Fish Protein Powder (Example 4) is added and the mixture is mixed until fully blended. Subsequently flavorings and sweeteners are added and mixed well. Add electrolytes and mix. Next add bulk carbohydrate components and mix until all lumps are smooth and blend is mostly homogenous.

The entire mixture is passed through a sheer pump or polishing mill (Stephan Microcut, Urschil Comitrol, or equivalent) to achieve uniform particle size of 200 μm or finer (e.g. 100-150 μm). Next, any texture-providing ingredients (toasted oats, nut pieces) or other granular components are added following the milling step. The resulting mixture is tempered to 110-130° F. to facilitate filling and handling. The product is filled into single-serve pouches or multi-serve tubs. Ideally allow to cool to <100° F. prior to packing into shipping cases to help prevent oil separation.

Example 4. Proteins Used in the Formulations Described Herein and Exemplified in Examples 1-3

The proteins used in the formulations described in Examples 1-3 are processed by the methods and systems described herein. Table 2A, as shown below, describes the composition an amino gram of solid, protein powder recovered from fish according to an embodiment of the present invention. Specifically, the yield of protein is 85.4%, moisture is 7.68%, and crude fat is 1.42%. The complexity of the amino acid structure as depicted below causes the osmolality rate, solubility rate, and PDCAAS as described herein.

TABLE 2A

CERTIFICATE OF ANALYSIS
Sample Identification
Sample #: 05-5432 Advance Protein Powder. Serving = 35 g
Method:
B0202: Amino Acid Profile (Total) by AOAC 98170
PB100 NLEA Abbreviated Nutrient Package (Proximate)
Results: OF AMINO GRAM Sample #05-5432

| Test | /100 g | Serving | Units | Theoretical Level |
|---|---|---|---|---|
| Protein - Food | 85.4 | 29.9 | grams | 85-90% |
| Protein = Nitrogen × 6.38 | | | | |
| Ash | 9.20 | 3.22 | grams | |
| Moisture By Vacuum Oven | 7.68 | 2.69 | grams | |
| Crude Fat By Acid Hydrolysis | 1.42 | 0.497 | grams | 0.5% |
| Calories, Calculated | 340 | 119 | calories | |
| Total Amino Acid Profile | | | | |
| Tryptophan | 1.06 | 0.371 | grams | |
| Cysteine | 0.83 | 0.291 | grams | |
| Methionine | 2.51 | 0.879 | grams | |
| Aspartic Acid | 4.58 | 1.6 | grams | |
| Threonine | 2.15 | 0.753 | grams | |
| Serine | 1.64 | 0.574 | grams | |
| Glutamic Acid | 6.64 | 2.32 | grams | |
| Proline | 1.89 | 0.662 | grams | |
| Glycine | 2.54 | 0.889 | grams | |
| Alanine | 2.9 | 1.015 | grams | |
| Valine | 2.31 | 0.809 | grams | |
| Isoleucine | 2.03 | 0.711 | grams | |
| Leucine | 3.51 | 1.23 | grams | |
| Tyrosine | 1.54 | 0.539 | grams | |
| Phenylalanine | 1.86 | 0.651 | grams | |
| Lysine, Total | 3.92 | 1.37 | grams | |
| Histidine | 1.22 | 0.427 | grams | |
| Arginine | 2.97 | 1.04 | grams | |

As shown in Table 2B, specific tests conducted on the recovered solid, protein powder derived from fish. As shown, the protein has over 98% digestible protein according to the well-known Pepsin test (0.2% Pepsin). Pepsin is a material that is used to digest protein structures. The Pepsin test is used to determine how much protein is within a mixture. The test involves analyzing the amount of protein that was digested, then back calculating that amount to the original quantity of protein material in the sample undergoing analysis. The trans-fatty acid isomers are less than. 1 wt. %, and preferably less than 0.05 wt. %. The amount of cholesterol is less than. 1 wt. %, preferably less than 0.05 wt. %, and more preferably less than 0.02 wt. % of a 100 g serving.

TABLE 2B

CERTIFICATE OF ANALYSIS
Sample identification:
Sample #: 05-5432 Advance Protein Powder. Serving = 35 g
Method:
B0003: Customized Analyses (Pepsin (0.2%) Digestible Protein)
B7033: Cholesterol by Gas Chromatography (GO. AOAC 994.10
O0201: Total Trans Fatty Acid by Gas Chromatography (GO. AOAC 996.06
Results: Sample #05-5432

| Test | /100 g | /Serving | Units |
|---|---|---|---|
| Pepsin (0.2%) Digestible Protein | 98.1 | 34.3 | grams |
| Total Trans Fatty Acid Isomers | 0.02 | 0.007 | grams |
| Cholesterol | 0.0173 | 0.00605 | grams |

As shown in Table 3 below, an elemental scan of the solid protein power indicates the following elements present in mg per serving. Also shown below in Table 3 is the amount of each element in parts per million.

TABLE 3

CERTIFICATE OF ANALYSIS AMINOGRAM
Sample Identification:
Sample #: 05-5432 Advance Protein Powder. Serving = 35 g
Method:
AL194: Elemenlal Scan (65) by ICP MS
Results: Sample #05-5432

| Test Elemental | Result (mcg/serving) | Result (ppm) |
|---|---|---|
| Lithium | <35 | <1 |
| Boron | <35 | <1 |
| Magnesium | 56,000 | 1,600 |
| Phosphorus | 220,000 | 6,400 |
| Calcium | 770,000 | 22,000 |
| Titanium | 77 | 2.2 |
| Chromium | 91 | 2.6 |
| Iron | 4,600 | 130 |
| Nickel | <35 | <1 |
| Zinc | 2,070 | 59 |
| Germanium | <35 | <1 |
| Selenium | 91 | 2.6 |
| Strontium | 3,900 | 110 |

TABLE 3-continued

CERTIFICATE OF ANALYSIS AMINOGRAM
Sample Identification:
Sample #: 05-5432 Advance Protein Powder. Serving = 35 g
Method:
AL194: Elemenlal Scan (65) by ICP MS
Results: Sample #05-5432

| Test Elemental | Result (mcg/serving) | Result (ppm) |
|---|---|---|
| Zirconium | <35 | <1 |
| Molybdenum | <35 | <1 |
| Rhodium | <35 | <1 |
| Silver | <35 | <1 |
| Indium | NA | NA |
| Antimony | <35 | <1 |
| Cesium | <35 | <1 |
| Lanthanum | <35 | <1 |
| Praseodymium | <35 | <1 |
| Beryllium | <35 | <1 |
| Sodium | 70,000 | 2,000 |
| Aluminum | 2,000 | 56 |
| Potassium | 190,000 | 5,500 |
| Scandium | <35 | <1 |
| Vanadium | <35 | <1 |
| Manganese | 120 | 3.3 |
| Cobalt | <35 | <1 |
| Copper | 160 | 4.7 |
| Gallium | <35 | <1 |
| Arsenic | <35 | <1 |
| Rubidium | 49 | 1.4 |
| Yttrium | <35 | <1 |
| Niobium | <35 | <1 |
| Ruthenium | <35 | <1 |
| Palladium | <35 | <1 |
| Cadmium | <35 | <1 |
| Tin | <180 | <5 |
| Tellurium | <35 | <1 |
| Barium | 63 | 1.8 |
| Cerium | <35 | <1 |
| Neodymium | <35 | <1 |
| Samarium | <35 | <1 |
| Gadolinium | <35 | <1 |
| Dysprosium | <35 | <1 |
| Erbium | <35 | <1 |

Table 4 shown below compares the nutritional content for 25 mg protein of one example of the recovered solid protein of the inventive process and system which subsequently has been milled into a powder "APP" versus 25 mg protein of commercial products on the market. APP is derived from fish. Specifically, APP has fewer calories than each of the commercial products except for NB soy. APP has fewer carbohydrates and fat than NB soy. Compared with JF soy, APP has fewer calories and less fat. Compared with each DFH whey, JF whey, GNC whey, Whey isolate and Whey concentrate, APP has fewer calories, carbohydrates, fat, saturated fat and cholesterol.

TABLE 4

| Standardized to 25 grams of protein per serving | | | | | | | |
|---|---|---|---|---|---|---|---|
| | APP | DFH whey | JF whey' | GNC whey | Whey isolate | Whey concentrate | JF soy | NB soy |
| Calories | 100 | 135 | 131 | 135 | 113 | 125 | 110 | 91 |
| Protein | 25 g | 25 g | 25 g | 25 g | 25 g | 25 g | 25 g | 25 g |
| Carbohydrate | 0 g | 3 g | 3 g | 4.2 g | 2.8 g | 3.1 g | 0 g | 0.7 g |
| Fat | 0 g | 2.1 g | 1.4 g | 2.1 g | 0.7 g | 1.6 g | 0.9 g | 0.2 g |
| Saturated Fat: | 0 g | 2.1 g | 2.3 g | 1.0 g | 0.5 g | 1.0 g | 0 g | 0 g |
| Cholesterol | 0 g | 31.3 mg | 69.4 mg | 72.9 mg | 2.8 mg | 64.6 mg | 0 g | 0 g |

Table 5 shown below compares chemical elements existing in 25 mg of one example of the recovered solid protein of the inventive process and system which subsequently has been milled into powder "APP" versus 25 mg protein of commercial products on the market. APP is derived from fish. Notably, the calcium, iron and zinc contents of 25 mg APP is significantly greater than for each of DFH whey, JF whey, GNC whey, Whey Isolate, Whey concentrate, JF soy and NB soy. The amount of iron present in APP is significantly greater than in each of DFH whey, JF whey, GNC whey, Whey isolate, and Whey concentrate.

TABLE 5

Comparing mineral content per 25 grams of protein as a percentage of the RDA

| | APP | DFH whey | JF whey | GNC whey | Whey Isolate | Whey concentrate | JF soy | NB soy |
|---|---|---|---|---|---|---|---|---|
| Calcium | 55% | 12.5% | 9.0% | | 8.3% | 18.8% | 2.9% | 5.0% |
| Iron | 18.1% | 4.2% | 1.8% | | | | 22.2% | 22.2% |
| Magnesium | 10% | | 3.5% | | | | | 2.8% |
| Zinc | 9.8% | | | | | | | 6.7% |
| Sodium | 2.1% | 2.0% | 1.7% | 2.6% | 2% | 2.3% | | 0.6% |
| Potassium | 4.6% | 4.6% | 3.7% | 5.7% | 8.7% | 3.7% | 10.6% | 12.9% |
| Phosphorus | 18.4% | 21.3% | 8.9% | | | | | 29.3%, |

What is claimed is:

1. A protein formulation, comprising:
   (i) from at least greater than 35 wt % of a protein powder to 75 wt % of the protein powder, wherein said protein powder comprises an animal protein, wherein the protein powder has over 98 wt % of digestible protein as measured by a 0.2% pepsin test; and
   (ii) greater than 10 wt % of fat by weight.

2. The protein formulation of claim 1, wherein said protein formulation comprises from about 14 wt % to about 18 wt % of said fat.

3. The protein formulation of claim 1, wherein said protein formulation comprises from about 25 wt % to about 35 wt % of said fat.

4. The protein formulation of claim 1, wherein said fat comprises omega-3 rich fish oil.

5. The protein formulation of claim 1, further comprising carbohydrates.

6. The protein formulation of claim 1, wherein said protein formulation has a slow digestive release.

7. The protein formulation of claim 1, wherein said animal protein is a protein from a marine animal.

8. The protein formulation of claim 7, wherein said animal protein is a protein from a fish.

9. The protein formulation of claim 1, wherein said protein formulation further comprises a sweetener and wherein the protein powder has a total trans fatty acid content of less than 0.05 wt % and a cholesterol content of less than 0.02 wt %.

10. A method of treating an individual, the method comprising administering to an individual a protein formulation that is:
    (i) from 35 wt % of a protein powder to 75 wt % of the protein powder, wherein said protein powder comprises an animal protein, wherein the protein powder has over 98 wt % of digestible protein as measured by a 0.2% pepsin test; and
    (ii) greater than 10 wt % of fat by weight.

11. The method of claim 10, wherein said individual has a chronic condition.

12. The method of claim 10, wherein said individual suffers from dehydration, nausea, vomiting, or pain.

13. The method of claim 10, wherein said individual is recovering from a surgery or from a therapy.

14. The method of claim 13, wherein said therapy is chemotherapy.

15. A method of treating malnutrition in an individual suffering thereof, the method comprising administering to the individual a ready to use therapeutic food, wherein said ready to use therapeutic food comprises the protein formulation of claim 1.

16. The method of claim 15, wherein said malnutrition is severe acute malnutrition or moderate acute malnutrition.

17. The method of claim 15, wherein said individual is a child.

18. The method of claim 15, wherein said therapeutic food has a slow digestive release.

19. A protein formulation, comprising:
    (i) from at least greater than 35 wt % of a protein powder to 75 wt % of the protein powder, wherein the protein powder comprises an animal or plant-based protein, wherein the protein powder has over 98 wt % of digestible protein as measured by a 0.2% pepsin test; and
    (ii) greater than 10 wt % of fat by weight, wherein the protein formulation further comprises a sweetener and wherein the protein powder has a total trans fatty acid content of less than 0.05 wt % and a cholesterol content of less than 0.02 wt %.

20. The protein formulation of claim 19, wherein the protein formulation comprises from about 14 wt % to about 18 wt % of the fat.

* * * * *